US008848909B2

(12) United States Patent
Michaels et al.

(10) Patent No.: US 8,848,909 B2
(45) Date of Patent: Sep. 30, 2014

(54) PERMISSION-BASED TDMA CHAOTIC COMMUNICATION SYSTEMS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 483 days.

(21) Appl. No.: 12/507,512

(22) Filed: Jul. 22, 2009

(65) Prior Publication Data

US 2011/0019817 A1 Jan. 27, 2011

(51) Int. Cl.
*H04L 29/06* (2006.01)
*H04K 1/02* (2006.01)

(52) U.S. Cl.
CPC .......................................... *H04K 1/02* (2013.01)
USPC ................................ 380/200; 380/31; 380/38

(58) Field of Classification Search
CPC .......................................................... H04L 9/00
USPC ............................................ 380/263, 31, 38
See application file for complete search history.

(56) References Cited

U.S. PATENT DOCUMENTS

| | | | |
|---|---|---|---|
| 3,564,223 | A | 2/1971 | Harris et al. |
| 4,095,778 | A | 6/1978 | Wing |
| 4,646,326 | A | 2/1987 | Backof, Jr. et al. |
| 4,703,507 | A | 10/1987 | Holden |
| 4,893,316 | A | 1/1990 | Janc et al. |
| 5,007,087 | A | 4/1991 | Bernstein et al. |
| 5,048,086 | A | 9/1991 | Bianco et al. |
| 5,077,793 | A | 12/1991 | Falk et al. |
| 5,210,770 | A | 5/1993 | Rice |
| 5,276,633 | A | 1/1994 | Fox et al. |
| 5,297,153 | A | 3/1994 | Baggen et al. |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Taylor, F.J., "Residue Arithmetic A Tutorial with Examples", Computer, vol. 17, No. 5, pp. 50-62, May 1984, doi: 10.1109/MC. 1984. 1659138.

(Continued)

*Primary Examiner* — Joseph P. Hirl
*Assistant Examiner* — Chi Nguy
(74) *Attorney, Agent, or Firm* — Fox Rothschild LLP; Robert J. Sacco, Esq.

(57) ABSTRACT

Systems (100) and methods for selectively controlling access to data streams communicated from a first communication device (FCD) using a timeslotted shared frequency spectrum and shared spreading codes. Protected data signals ($\mathbf{130}_1, \ldots, \mathbf{130}_S$) are modulated to form first modulated signals ($\mathbf{132}_1, \ldots, \mathbf{132}_S$). The first modulated signals are combined with first chaotic spreading codes to form digital chaotic signals. The digital chaotic signals are additively combined to form a protected data communication signal (PDCS). The PDCS (136) and a global data communication signal (GDCS) are time division multiplexed to form an output communication signal (OCS). The OCS (140) is transmitted from FCD (102) to a second communication device (SCD) over a communications channel. The SCD (106, 108, 110) is configured to recover (a) only global data from the OCS, or (b) global data and at least some protected data from the OCS.

22 Claims, 9 Drawing Sheets

(56) References Cited

U.S. PATENT DOCUMENTS

| | | | | |
|---|---|---|---|---|
| 5,297,206 | A | 3/1994 | Orton | |
| 5,319,735 | A | 6/1994 | Preuss et al. | |
| 5,412,687 | A | 5/1995 | Sutton et al. | |
| 5,596,600 | A | 1/1997 | Dimos et al. | |
| 5,598,476 | A | 1/1997 | LaBarre et al. | |
| 5,646,997 | A | 7/1997 | Barton | |
| 5,677,927 | A | 10/1997 | Fullerton et al. | |
| 5,680,462 | A | 10/1997 | Miller et al. | |
| 5,757,923 | A | 5/1998 | Koopman, Jr. | |
| 5,811,998 | A | 9/1998 | Lundberg et al. | |
| 5,852,630 | A | 12/1998 | Langberg et al. | |
| 5,900,835 | A | 5/1999 | Stein | |
| 5,923,760 | A | 7/1999 | Abarbanel et al. | |
| 5,924,980 | A | 7/1999 | Coetzee | |
| 5,937,000 | A | 8/1999 | Lee et al. | |
| 5,963,584 | A | 10/1999 | Boulanger et al. | |
| 6,014,446 | A | 1/2000 | Finkelstein | |
| 6,023,612 | A | 2/2000 | Harris et al. | |
| 6,038,317 | A | 3/2000 | Magliveras et al. | |
| 6,078,611 | A | 6/2000 | La Rosa et al. | |
| 6,141,786 | A | 10/2000 | Cox et al. | |
| 6,212,239 | B1 | 4/2001 | Hayes | |
| 6,304,216 | B1 | 10/2001 | Gronemeyer | |
| 6,304,556 | B1 | 10/2001 | Haas | |
| 6,310,906 | B1 | 10/2001 | Abarbanel et al. | |
| 6,314,187 | B1 | 11/2001 | Menkhoff et al. | |
| 6,331,974 | B1 | 12/2001 | Yang et al. | |
| 6,377,782 | B1 | 4/2002 | Bishop et al. | |
| 6,473,448 | B1 | 10/2002 | Shono et al. | |
| 6,529,568 | B1 | 3/2003 | Richards et al. | |
| 6,570,909 | B1 | 5/2003 | Kansakoski et al. | |
| 6,614,914 | B1 | 9/2003 | Rhoads et al. | |
| 6,665,692 | B1 | 12/2003 | Nieminen | |
| 6,732,127 | B2 | 5/2004 | Karp | |
| 6,744,893 | B1 | 6/2004 | Fleming-Dahl | |
| 6,754,251 | B1 | 6/2004 | Sriram et al. | |
| 6,766,345 | B2 | 7/2004 | Stein et al. | |
| 6,842,479 | B2 | 1/2005 | Bottomley | |
| 6,842,745 | B2 | 1/2005 | Occhipinti et al. | |
| 6,864,827 | B1 | 3/2005 | Tise et al. | |
| 6,865,218 | B1 | 3/2005 | Sourour | |
| 6,888,813 | B1 | 5/2005 | Kishi | |
| 6,901,104 | B1 | 5/2005 | Du et al. | |
| 6,914,949 | B2 | 7/2005 | Richards et al. | |
| 6,937,568 | B1 | 8/2005 | Nicholl et al. | |
| 6,980,656 | B1 | 12/2005 | Hinton, Sr. et al. | |
| 6,980,657 | B1 | 12/2005 | Hinton, Sr. et al. | |
| 6,986,054 | B2 | 1/2006 | Kaminaga et al. | |
| 6,993,016 | B1 | 1/2006 | Liva et al. | |
| 6,999,445 | B1 | 2/2006 | Dmitriev et al. | |
| 7,023,323 | B1 | 4/2006 | Nysen | |
| 7,024,172 | B1 | 4/2006 | Murphy et al. | |
| 7,027,598 | B1 | 4/2006 | Stojancic et al. | |
| 7,035,220 | B1 | 4/2006 | Simcoe | |
| 7,069,492 | B2 | 6/2006 | Piret et al. | |
| 7,076,065 | B2 | 7/2006 | Sherman et al. | |
| 7,078,981 | B2 | 7/2006 | Farag | |
| 7,079,651 | B2 | 7/2006 | Den Boer et al. | |
| 7,095,778 | B2 | 8/2006 | Okubo et al. | |
| 7,133,522 | B2 | 11/2006 | Lambert | |
| 7,170,997 | B2 | 1/2007 | Petersen et al. | |
| 7,190,681 | B1 | 3/2007 | Wu | |
| 7,200,225 | B1 | 4/2007 | Schroeppel | |
| 7,233,969 | B2 | 6/2007 | Rawlins et al. | |
| 7,233,970 | B2 | 6/2007 | North et al. | |
| 7,245,723 | B2 | 7/2007 | Hinton, Sr. et al. | |
| 7,254,187 | B2 | 8/2007 | Mohan et al. | |
| 7,269,198 | B1 | 9/2007 | Elliott et al. | |
| 7,269,258 | B2 | 9/2007 | Ishihara et al. | |
| 7,272,168 | B2 | 9/2007 | Akopian | |
| 7,277,540 | B1 | 10/2007 | Shiba et al. | |
| 7,286,802 | B2 | 10/2007 | Beyme et al. | |
| 7,310,309 | B1 | 12/2007 | Xu | |
| 7,349,381 | B1 | 3/2008 | Clark et al. | |
| 7,423,972 | B2 | 9/2008 | Shaham et al. | |
| 7,529,292 | B2 | 5/2009 | Bultan et al. | |
| 7,643,537 | B1 | 1/2010 | Giallorenzi et al. | |
| 7,725,114 | B2 | 5/2010 | Feher | |
| 7,779,060 | B2 | 8/2010 | Kocarev et al. | |
| 7,830,214 | B2 | 11/2010 | Han et al. | |
| 7,853,014 | B2 | 12/2010 | Blakley et al. | |
| 7,929,498 | B2 | 4/2011 | Ozluturk et al. | |
| 7,949,032 | B1 | 5/2011 | Frost | |
| 7,974,146 | B2 | 7/2011 | Barkley | |
| 8,165,065 | B2 | 4/2012 | Michaels | |
| 2001/0017883 | A1 | 8/2001 | Tiirola et al. | |
| 2002/0012403 | A1 | 1/2002 | McGowan et al. | |
| 2002/0034191 | A1 | 3/2002 | Shattil | |
| 2002/0034215 | A1 | 3/2002 | Inoue et al. | |
| 2002/0041623 | A1 | 4/2002 | Umeno | |
| 2002/0054682 | A1 | 5/2002 | Di Bernardo et al. | |
| 2002/0061080 | A1 | 5/2002 | Richards et al. | |
| 2002/0061081 | A1 | 5/2002 | Richards et al. | |
| 2002/0094797 | A1 | 7/2002 | Marshall et al. | |
| 2002/0099746 | A1 | 7/2002 | Tie et al. | |
| 2002/0110182 | A1 | 8/2002 | Kawai | |
| 2002/0115461 | A1 | 8/2002 | Shiraki et al. | |
| 2002/0122465 | A1 | 9/2002 | Agee et al. | |
| 2002/0128007 | A1 | 9/2002 | Miyatani | |
| 2002/0172291 | A1 | 11/2002 | Maggio et al. | |
| 2002/0174152 | A1 | 11/2002 | Terasawa et al. | |
| 2002/0176511 | A1 | 11/2002 | Fullerton et al. | |
| 2002/0186750 | A1 | 12/2002 | Callaway et al. | |
| 2003/0007639 | A1 | 1/2003 | Lambert | |
| 2003/0016691 | A1 | 1/2003 | Cho | |
| 2003/0044004 | A1 | 3/2003 | Blakley et al. | |
| 2003/0156603 | A1 | 8/2003 | Rakib et al. | |
| 2003/0182246 | A1 | 9/2003 | Johnson et al. | |
| 2003/0198184 | A1 | 10/2003 | Huang et al. | |
| 2004/0001534 | A1 | 1/2004 | Yang | |
| 2004/0001556 | A1 | 1/2004 | Harrison et al. | |
| 2004/0059767 | A1 | 3/2004 | Liardet | |
| 2004/0092291 | A1 | 5/2004 | Legnain et al. | |
| 2004/0100588 | A1 | 5/2004 | Hartson et al. | |
| 2004/0146095 | A1 | 7/2004 | Umeno et al. | |
| 2004/0156427 | A1 | 8/2004 | Gilhousen et al. | |
| 2004/0161022 | A1 | 8/2004 | Glazko et al. | |
| 2004/0165650 | A1 | 8/2004 | Miyazaki et al. | |
| 2004/0165681 | A1 | 8/2004 | Mohan | |
| 2004/0184416 | A1 | 9/2004 | Woo | |
| 2004/0196212 | A1 | 10/2004 | Shimizu | |
| 2004/0196933 | A1 | 10/2004 | Shan et al. | |
| 2005/0004748 | A1 | 1/2005 | Pinto et al. | |
| 2005/0021308 | A1 | 1/2005 | Tse et al. | |
| 2005/0031120 | A1 | 2/2005 | Samid | |
| 2005/0050121 | A1 | 3/2005 | Klein et al. | |
| 2005/0075995 | A1 | 4/2005 | Stewart et al. | |
| 2005/0089169 | A1 | 4/2005 | Kim et al. | |
| 2005/0129096 | A1 | 6/2005 | Zhengdi et al. | |
| 2005/0207574 | A1 | 9/2005 | Pitz et al. | |
| 2005/0249271 | A1 | 11/2005 | Lau et al. | |
| 2005/0254587 | A1 | 11/2005 | Kim et al. | |
| 2005/0259723 | A1 * | 11/2005 | Blanchard | 375/146 |
| 2005/0265430 | A1 | 12/2005 | Ozluturk et al. | |
| 2005/0274807 | A1 | 12/2005 | Barrus et al. | |
| 2006/0034378 | A1 | 2/2006 | Lindskog et al. | |
| 2006/0072754 | A1 | 4/2006 | Hinton et al. | |
| 2006/0088081 | A1 | 4/2006 | Withington et al. | |
| 2006/0093136 | A1 | 5/2006 | Zhang et al. | |
| 2006/0123325 | A1 | 6/2006 | Wilson et al. | |
| 2006/0128503 | A1 | 6/2006 | Savarese et al. | |
| 2006/0209926 | A1 * | 9/2006 | Umeno et al. | 375/146 |
| 2006/0209932 | A1 | 9/2006 | Khandekar et al. | |
| 2006/0239334 | A1 | 10/2006 | Kwon et al. | |
| 2006/0251250 | A1 | 11/2006 | Ruggiero et al. | |
| 2006/0264183 | A1 | 11/2006 | Chen et al. | |
| 2007/0098054 | A1 | 5/2007 | Umeno | |
| 2007/0121945 | A1 | 5/2007 | Han et al. | |
| 2007/0133495 | A1 | 6/2007 | Lee et al. | |
| 2007/0149232 | A1 | 6/2007 | Koslar | |
| 2007/0195860 | A1 | 8/2007 | Yang et al. | |
| 2007/0201535 | A1 | 8/2007 | Ahmed | |
| 2007/0217528 | A1 | 9/2007 | Miyoshi et al. | |
| 2007/0230701 | A1 | 10/2007 | Park et al. | |

(56) References Cited

U.S. PATENT DOCUMENTS

| | | | | |
|---|---|---|---|---|
| 2007/0253464 | A1 | 11/2007 | Hori et al. | |
| 2007/0291833 | A1 | 12/2007 | Shimanskiy | |
| 2008/0008320 | A1 | 1/2008 | Hinton et al. | |
| 2008/0016431 | A1 | 1/2008 | Lablans | |
| 2008/0019422 | A1 | 1/2008 | Smith et al. | |
| 2008/0026706 | A1 | 1/2008 | Shimizu et al. | |
| 2008/0075195 | A1 | 3/2008 | Pajukoski et al. | |
| 2008/0080439 | A1 | 4/2008 | Aziz et al. | |
| 2008/0084919 | A1 | 4/2008 | Kleveland et al. | |
| 2008/0095215 | A1 | 4/2008 | McDermott et al. | |
| 2008/0107268 | A1 | 5/2008 | Rohde et al. | |
| 2008/0198832 | A1 | 8/2008 | Chester | |
| 2008/0204306 | A1 | 8/2008 | Shirakawa | |
| 2008/0263119 | A1 | 10/2008 | Chester et al. | |
| 2008/0294707 | A1 | 11/2008 | Suzuki et al. | |
| 2008/0294710 | A1 | 11/2008 | Michaels | |
| 2008/0294956 | A1 | 11/2008 | Chester et al. | |
| 2008/0304553 | A1 | 12/2008 | Zhao et al. | |
| 2008/0304666 | A1 | 12/2008 | Chester et al. | |
| 2008/0307022 | A1 | 12/2008 | Michaels et al. | |
| 2008/0307024 | A1 | 12/2008 | Michaels et al. | |
| 2009/0022212 | A1 | 1/2009 | Ito et al. | |
| 2009/0034727 | A1 | 2/2009 | Chester et al. | |
| 2009/0044080 | A1 | 2/2009 | Michaels et al. | |
| 2009/0059882 | A1 | 3/2009 | Hwang et al. | |
| 2009/0086848 | A1 | 4/2009 | Han et al. | |
| 2009/0110197 | A1 | 4/2009 | Michaels | |
| 2009/0122926 | A1 | 5/2009 | Azenkot et al. | |
| 2009/0175258 | A1 * | 7/2009 | Wang et al. | 370/347 |
| 2009/0196420 | A1 | 8/2009 | Chester et al. | |
| 2009/0202067 | A1 | 8/2009 | Michaels et al. | |
| 2009/0245327 | A1 | 10/2009 | Michaels | |
| 2009/0279688 | A1 | 11/2009 | Michaels et al. | |
| 2009/0279690 | A1 | 11/2009 | Michaels et al. | |
| 2009/0285395 | A1 | 11/2009 | Hu et al. | |
| 2009/0296860 | A1 | 12/2009 | Chester et al. | |
| 2009/0300088 | A1 | 12/2009 | Michaels et al. | |
| 2009/0309984 | A1 | 12/2009 | Bourgain et al. | |
| 2009/0310650 | A1 | 12/2009 | Chester et al. | |
| 2009/0316679 | A1 | 12/2009 | Van Der Wateren | |
| 2009/0323766 | A1 | 12/2009 | Wang et al. | |
| 2009/0327387 | A1 | 12/2009 | Michaels et al. | |
| 2010/0029225 | A1 | 2/2010 | Urushihara et al. | |
| 2010/0030832 | A1 | 2/2010 | Mellott | |
| 2010/0054225 | A1 * | 3/2010 | Hadef et al. | 370/342 |
| 2010/0073210 | A1 | 3/2010 | Bardsley et al. | |
| 2010/0111296 | A1 | 5/2010 | Brown et al. | |
| 2010/0142593 | A1 | 6/2010 | Schmid | |
| 2010/0254430 | A1 | 10/2010 | Lee et al. | |
| 2010/0260276 | A1 | 10/2010 | Orlik et al. | |
| 2011/0222393 | A1 | 9/2011 | Kwak et al. | |
| 2011/0243197 | A1 * | 10/2011 | Atarashi et al. | 375/146 |

FOREIGN PATENT DOCUMENTS

| | | | |
|---|---|---|---|
| EP | 2 000 900 | A2 | 12/2008 |
| EP | 2 000 902 | A2 | 12/2008 |
| GB | 1167272 | A | 10/1969 |
| JP | 7140983 | A | 6/1995 |
| JP | 2001255817 | A | 9/2001 |
| JP | 2004279784 | A | 10/2004 |
| JP | 2004343509 | A | 12/2004 |
| JP | 2005017612 | A | 1/2005 |
| WO | WO-0135572 | A2 | 5/2001 |
| WO | WO-2006 110954 | | 10/2006 |
| WO | WO 2008 065191 | | 6/2008 |
| WO | WO-2008099367 | A2 | 8/2008 |
| WO | WO-2008130973 | A1 | 10/2008 |
| WO | WO 2009 146283 | | 12/2009 |

OTHER PUBLICATIONS

Barda, A; et al., "Chaotic signals for multiple access communications," Electrical and Electronics Engineers in Israel, 1995, Eighteenth Convention of, vol., No., pp. 2.1.3/1-2.1/3/5, Mar 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Japanese Office Action dated Aug. 29, 2012, Application Serial No. 2011-531166 in the name of Harris Corporation.

Bender, et al., "Techniques for data hiding", 1995, IBM Systems Journal, vol. 35, pp. 313-336.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html, Retrieved on May 29, 2007.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

(56) References Cited

OTHER PUBLICATIONS

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html, Retrieved on May 29, 2007.

Weisstein, Eric W. "Surjection," From MathWorld—A Wolfram Web Resource, http://mathworld.wolfram.com/Surjection.html, Retrieved on May 29, 2007.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 20/9, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquition Using Chaotic Sequence Spread Waveform".

Michaels, Alan, U.S. Appl. No. 12/201,021, filed Aug. 9, 2008, entitled, "Multi-Tier Ad-Hoc Network Communications".

Office Action issued in Japanese Patent Application No. 2010-504206 in the name of Harris Corporation; mailed Jan. 6, 2012.

Aparicio; "Communications Systems Based on Chaos" May 2007. Universidad Rey Juan Carlos.

Bererber, S.M., et al., "Design of a CDMA System in FPGA Technology", Vehicular Technology Conference, 2007. VTC2007—Spring. IEEE $65^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE Africon 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] Retrieved from the Internet: <http://mathworld.wolfram.com/Bijective.html>, May 29, 2007.

Weisstein, E., Surejection:, From MathWorld—AWolfram Web Resource [online] [retrieved on Nov. 8, 2010] Retrieved from the Internet: <http://mathworld.wolfram.com/surjection.html>.

(56) References Cited

OTHER PUBLICATIONS

Weisstein, E. 'Injection' From MathWorld-AWolfram Web Resource [online] [retrieved on Nov. 8, 2010] Retrieved from the Internet: http://mathworld.wolfram.com/iniection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

* cited by examiner

Spreading Code $Y_{i\_0}(nT) = [W_1 \ W_2 \ W_3 \ldots W_{w-3} \ W_{w-2} \ W_{w-1} \ W_w]$ Spreading Code $Y_{i\_1}(nT) = [W_{w-52} \ W_{w-51} \ldots W_1 \ W_2 \ W_3 \ldots W_{w-50} \ W_{w-51}]$ Spreading Code $Y_{i\_2}(nT) = [W_{w-152} \ W_{w-151} \ldots W_1 \ W_2 \ W_3 \ldots W_{w-150} \ W_{w-151}]$ Spreading Code $Y_{i\_3}(nT) = [W_{w-25} \ W_{w-26} \ldots W_1 \ W_2 \ W_3 \ldots W_{w-23} \ W_{w-24}]$

FIG. 3A

Spreading Code $Y_{i\_0}(nT) = [W_1 \ W_2 \ W_3 \ldots W_{w-3} \ W_{w-2} \ W_{w-1} \ W_w]$ Spreading Code $Y_{i\_1}(nT) = [W_{w-k1} \ W_{w-(k1+1)} \ldots W_{w-(k1-2)} \ W_{w-(k1-1)}]$ Spreading Code $Y_{i\_2}(nT) = [W_{w-k2} \ W_{w-(k2+1)} \ldots W_{w-(k2-2)} \ W_{w-(k2-1)}]$ Spreading Code $Y_{i\_3}(nT) = [W_{w-k3} \ W_{w-(k3+1)} \ldots W_{w-(k3-2)} \ W_{w-(k3-1)}]$

FIG. 3B

PERMISSION-BASED TDMA CHAOTIC COMMUNICATION SYSTEMS

BACKGROUND OF THE INVENTION

1. Statement of the Technical Field

The invention concerns communication systems. More particularly, the invention concerns permission-based time division multiple access (TDMA) chaotic communication systems.

2. Description of the Related Art

Multiple access communication systems permit multiple users to re-use a portion of a shared transmission spectrum for simultaneous communications. Multiple access communications may be implemented using frequency diversity, spatial diversity (with directional antennas), time diversity, or coding diversity. The most common method of employing time diversity in a multiple access communication system is with time division multiple access (TDMA), where multiple users have designated timeslots within a coordinated communications period called a frame or epoch in which to transmit their information. In some cases, the frame is of such short duration that users transmitting low data rates (e.g., voice communication signals) appear to receive continuous service. Numerous variations to the basic TDMA communications approach exist, with increased performance of a communications waveform or protocol translating to more users or more efficient use of the communications spectrum. Most often, the scheduling of epochs and timeslots is chosen as a deterministic process. The most common method of coding diversity, as often applied to code division multiple access communication systems, is the use of statistically orthogonal (or, more simply, orthogonal) spreading codes that can be used to differentiate between two or more signals. The phrase "statistically orthogonal spreading codes", as used herein, refers to spreading codes whose inner product over a finite duration has a statistical expectation of zero.

Pseudorandom number generators (PRNG) generally utilize digital logic or a digital computer and one or more algorithms to generate a sequence of numbers. While the output of conventional PRNG may approximate some of the properties of random numbers, they are not truly random. For example, the output of a PRNG has cyclostationary features that can be identified by analytical processes.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences digitally requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. Chaotic waveforms also have an impulsive autocorrelation and a compact power spectrum, which make them ideal for use in a multiple access communication system. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing returns because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

In particular, time division communication systems employing chaotic signals are especially sensitive to chaotic state uncertainties since a receiver not continuously synchronized to a transmitter requires additional computational effort to re-acquire the chaotic signal during each of its assigned communication bursts. The drift that occurs between assigned timeslots limits the flexibility of applying time division multiple access (TDMA) communications protocols using a chaotic physical layer signal. Permission-based timeslot scheduling algorithms, as commonly used in TDMA communications protocols, is an additional complexity that is currently not supported by communications with a chaotic signal since the generation of orthogonal communication signals using chaotic signals requires extreme flexibility in the determination of initial chaotic state parameters.

The alternative to date has been to implement non-coherent chaotic waveforms. However, non-coherent chaotic waveform based communication systems suffer from reduced throughput, error rate performance and exploitability. In this context, the phrase "non-coherent waveform" means that the receiver is not required to reproduce a synchronized copy of the chaotic signals that have been generated in the transmitter. The phrase "communications using a coherent waveform"

means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. There is further a need for a chaos-based time division multiple access communication system.

SUMMARY OF THE INVENTION

Embodiments of the present invention relate to methods for selectively controlling access to multiple data streams which are communicated from a first communication device using a timeslotted shared frequency spectrum and shared spreading codes. The methods involve modulating protected data signals including protected data to form two or more first modulated signals. The first modulated signals are formed using a plurality of discrete-time modulation processes. Each discrete-time modulation process is selected from the group comprising an M-ary phase shift keying modulation process, a quadrature amplitude modulation process and an amplitude shift keying modulation process. The first modulated signals are combined with first chaotic spreading codes to form digital chaotic signals having spread spectrum formats. The digital chaotic signals are additively combined to form a composite protected data communication signal. The composite protected data communication signal is time division multiplexed with a global data communication signal to form an output communication signal. The output communication signal is transmitted from the first communication device to a second communication device over a communications channel. The second communication device is configured to recover: only global data from the output communication signal; or (b) global data and at least a portion of protected data from the output communication signal.

According to aspects of the present invention, the first chaotic spreading codes are generated using different values for at least one generation parameter of a chaotic sequence. The generation parameter is selected from the group comprising a sequence location parameter, a polynomial equation parameter and an N-tuple of moduli parameter. The first chaotic spreading codes can also be generated by dynamically varying a value for a generation parameter of a chaotic sequence according to a chosen TDM frame or timeslot duration. The chaotic spreading codes can be selected to be a chaotic spreading sequence generated using a plurality of polynomial equations and modulo operations.

According to other aspects of the present invention, the methods involve modulating a global data signal to form a second modulated signal. The second modulated signal is combined with a second chaotic spreading code to form the global data communication signal having a spread spectrum format. The second modulated signal is formed using an amplitude-and-time-discrete modulation process. The amplitude-and-time-discrete modulation process is selected from the group comprising an M-ary phase shift keying modulation process, a quadrature amplitude modulation process and an amplitude shift keying modulation process.

Embodiments of the present invention also concern communication systems configured for selectively controlling access to multiple data streams which are communicated using a timeslotted shared frequency spectrum and shared spreading codes. The communication systems generally implement the above described methods. Accordingly, the communication systems include at least sequence generator, a first modulator, a first combiner, a second combiner, a multiplexer and a transceiver. The sequence generator is configured to generate the first chaotic spreading codes. The first modulator is configured to modulate protected data signals to form the first modulated signals. The first combiner is configured to combine the first modulated signals with the first chaotic spreading codes to form digital chaotic signals having spread spectrum formats. The second combiner is configured to additively combine the digital chaotic signals to form the composite protected data communication signal. The multiplexer is configured to time division multiplex the composite protected data communication signal with a global data communication signal to form the output communication signal. The transceiver is configured to transmit the output communication signal from the first communication device to the second communication device over a communications channel.

BRIEF DESCRIPTION OF THE DRAWINGS

Embodiments will be described with reference to the following drawing figures, in which like numerals represent like items throughout the figures, and in which:

FIG. 3A is a schematic illustration of chaotic spreading codes that is useful for understanding the present invention.

FIG. 3B is a schematic illustration of chaotic spreading codes that is useful for understanding the present invention.

DETAILED DESCRIPTION OF THE PREFERRED EMBODIMENTS

Embodiments of the present invention will now be described with respect to FIGS. 1-8. Embodiments of the present invention relate to Time Division Multiple Access (TDMA) permission-based communications systems. Signals containing protected data are modulated to form at least two modulated signals. Each of the modulated signals is combined with one or more orthogonal chaotic spreading codes to form a digital chaotic signal. The digital chaotic signals are additively combined to form a composite protected data communication signal. The composite protected data communication signal and a global data communication signal are time division multiplexed to form an output communication signal.

In one embodiment, different chaotic spreading codes are used during different timeslots of a Time Division Multiplex (TDM) frame. In another embodiment, a chaotic spreading code is cyclically shifted during the two or more timeslots of the TDM frame. It should be noted that chaotic spreading codes have an impulsive autocorrelation function, such that any substantial cyclical shift in the sequence will practically ensure orthogonality between the resulting shifted and unshifted chaotic spreading codes. In a third embodiment, a combination of these methods can be used. Receivers may or may not be able to receive data transmitted during selected timeslots, depending on whether they are configured to reproduce the particular chaotic spreading code which is used to transmit during a particular timeslot. Receivers may also be configured to reproduce a plurality of chaotic spreading codes generated at one or more TDM-based transmitters, either to aid with transmission of global data/tracking information or to facilitate a plurality of communications links between multiple users. The transmit and receive timeslot assignments are typically performed using a timeslot scheduling algorithm.

For purposes of simplicity and clarity of description, embodiments of the present invention will be described in terms of a simplex link between one transmitter and one receiver whose operation varies based on assigned permissions. All such extensions of a simplex communications link to a duplex TDMA communication system via use of protocol definitions and scheduling algorithms are well known to those having ordinary skill in the art, and therefore will not be described herein. Still, embodiments of the present invention are not limited in this regard.

The TDMA communication systems of the present invention can be utilized in a variety of different applications where access to certain types of data is restricted. Such applications include, but are not limited to, military applications and commercial mobile/cellular telephone applications.

Multiple Access Communications System

Figure 1:
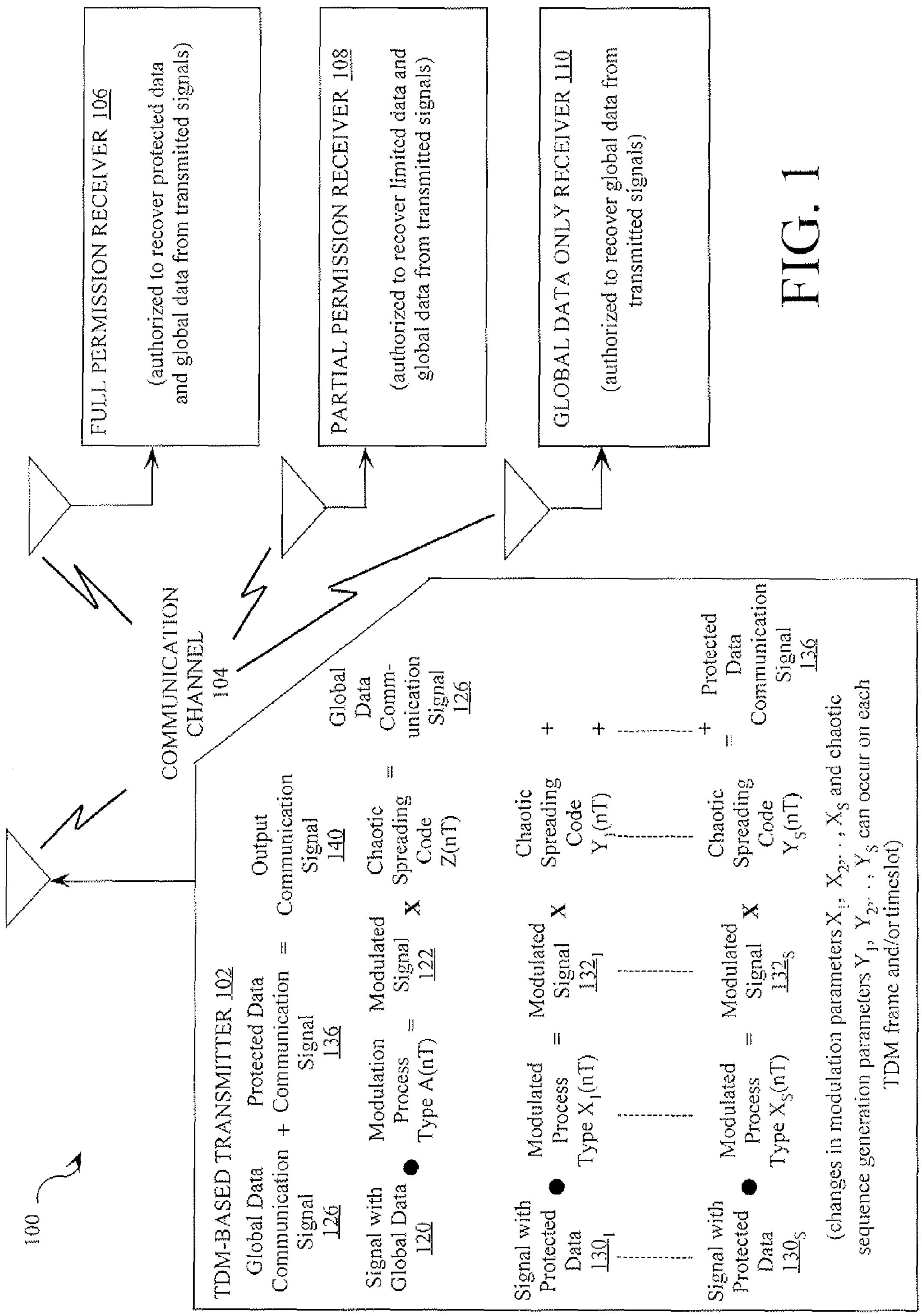
FIG. 1 is a schematic illustration of an exemplary communication system that is useful for understanding the present invention.

Referring now to FIG. 1, there is provided a schematic illustration of an exemplary communication system 100 that is useful for understanding the present invention. As shown in FIG. 1, communication system 100 is comprised of a Time Division Multiplexing based (TDM-based) transmitter 102 and receivers 106, 108, 110. TDM-based transmitter 102 is generally configured to generate an output communication signal (OCS) 140 having chaotic properties that represents both a global data communication signal 126 and a protected data communication signal 136. OCS 140 is generated using a coherent chaotic sequence spread spectrum (CCSSS) method.

The CCSSS method generally involves modulating at least one signal including protected data $\mathbf{130}_1$, $\mathbf{130}_2$ (not shown in FIG. 1), . . . , $\mathbf{130}_S$ to form an amplitude-and-time-discrete baseband modulated signal $\mathbf{132}_1$, $\mathbf{132}_2$ (not shown in FIG. 1), . . . , $\mathbf{132}_S$. Each of the signals $\mathbf{130}_1$, $\mathbf{130}_2$ (not shown in FIG. 1), . . . , $\mathbf{130}_S$ is also referred to herein as a "protected data signal". The protected data signals $\mathbf{130}_1$, $\mathbf{130}_2$ (not shown in FIG. 1), . . . , $\mathbf{130}_S$ can include data from one or more data sources (not shown). The modulated signals $\mathbf{132}_1$, $\mathbf{132}_2$ (not shown in FIG. 1), . . . , $\mathbf{132}_S$ may be created using any discrete-time modulation process of the type(s) $X_1(nT)$, $X_2(nT)$ (not shown in FIG. 1), . . . , and $X_S(nT)$. The modulation types $X_1(nT)$, $X_2(nT)$ (not shown in FIG. 1), . . . , $X_S(nT)$ may be chosen independently. The discrete-time modulation processes can include, but are not limited to, M-ary Phase Shift Keying (PSK) modulation processes, Quadrature Amplitude Modulation (QAM) processes and amplitude shift keying modulation processes. Such modulation processes are well known to those having ordinary skill in the art, and therefore will not be described herein.

As shown in FIG. 1, the modulated signals $\mathbf{132}_1$, $\mathbf{132}_2$ (not shown in FIG. 1), . . . , $\mathbf{132}_S$ are combined with one or more orthogonal chaotic spreading codes $Y_1(nT)$, $Y_2(nT)$ (not shown in FIG. 1), . . . , $Y_S(nT)$, whose chaotic sequence generation parameters $Y_1$, . . . , $Y_S$ are dynamically varied according to a chosen TDM frame and/or timeslot duration. The chaotic spreading codes $Y_1(nT)$, $Y_2(nT)$ (not shown in FIG. 1), . . . , $Y_S(nT)$ are used to spread the modulated signals $\mathbf{132}_1$, $\mathbf{132}_2$ (not shown in FIG. 1), . . . , $\mathbf{132}_S$ over a wide intermediate frequency band by multiplying the modulated signals $\mathbf{132}_1$, $\mathbf{132}_2$ (not shown in FIG. 1), . . . , $\mathbf{132}_S$ by the corresponding digital chaotic spreading codes $Y_1(nT)$, $Y_2(nT)$ (not shown in FIG. 1), . . . , $Y_S(nT)$. The products of these arithmetic operations are hereinafter referred to as "digital chaotic signals". The digital chaotic signals are additively combined to form a composite protected data communication signal (PDCS) 136. The PDCS 136 is separable into each of the modulated signals $\mathbf{132}_1$, $\mathbf{132}_2$ (not shown in FIG. 1), . . . , $\mathbf{132}_S$ by correlating the PDCS 136 with a synchronized replica of the chaotic spreading codes $Y_1(nT)$, $Y_2(nT)$ (not shown in FIG. 1), . . . , $Y_S(nT)$. Correlation operations are well known to those having ordinary skill in the art, and therefore will not be described herein.

The PDCS 136 can be constructed from any number of protected data signals without loss of generality. For that reason, the following discussion will focus on two (2) distinct classes of protected data signals. The distinct classes include a first class in which the users of the system 100 have permission to access the protected data signals and a second class in which the users of the system 100 do not have permission to access the protected data signals. Embodiments of the present invention are not limited in this regard.

Referring again to FIG. 1, the TDM-based transmitter 102 is also configured for generating a global data communication signal (GDCS) 126. In this regard, a signal with global data 120 is received from an external data source (not shown). The signal 120 is also referred to herein as a "global data signal". The global data signal 120 is modulated to form a modulated signal 122 using an amplitude-and-time-discrete modulation process of the type A(nT). The modulation process may be any known amplitude-and-time-discrete modulation process. For example, the amplitude-and-time-discrete modulation process may include, but is not limited to, an M-ary PSK phase modulation process, a quadrature amplitude modulation (QAM) process, and amplitude shift keying modulation process. Such modulation processes are well known to those having ordinary skill in the art, and therefore will not be described herein.

The GDCS 126 may be constructed from multiple independent global data signals, similar to the construction of the PDCS 136. For purposes of simplicity and clarity of discussion, only one GDCS 126 is described herein. The modulated signal 122 is combined with an orthogonal chaotic spreading code Z(nT) (orthogonal relative to chaotic spreading codes $Y_1(nT)$, $Y_2(nT)$, . . . , $Y_S(nT)$). At least one chaotic sequence generation parameter of the chaotic spreading code Z(nT) is dynamically varied according to a chosen TDM frame and/or timeslot duration. The chaotic spreading code Z(nT) is used to spread the modulated signal 122 over a wide intermediate frequency band by multiplying the modulated signal 122 by the corresponding digital chaotic spreading code Z(nT). The result of this spreading operation is the GDCS 126.

The GDCS 126 and PDCS 136 are time division multiplexed to form the OCS 140. OCS 140 resembles a truly random signal due to the nature of the chaotic spreading codes Z(nT), $Y_1(nT)$, $Y_2(nT)$, . . . , $Y_S(nT)$. It should be noted that "time division multiplexing" is represented in FIG. 1 by a plus sign. Time division multiplexing is well known to those having ordinary skill in the art, and therefore will not be described herein. However, it should be understood that GDCS 126 and PDCS 136 are transmitted during timeslots of a TDM frame (described below in relation to FIG. 2). In particular, it should be noted that either or both signals 126, 136 may be present or absent during a given timeslot, permitting communications flexibility in assigning a transmitter to transmit no signal, transmit a GDCS 126 only, transmit a PDCS 136 only, or transmit a combination of GDCS 126 and PDCS 136 during a particular timeslot. The PDCS 136 can also vary its selection of protected data signals on timeslot boundaries, meaning that any selection of signals with protected data can be transmitted during a particular timeslot.

It should be noted that during construction of the PDCS 136 and the GDCS 126 into the OCS 140, the TDM-based transmitter 102 may be configured to vary parameters of all modulation processes and/or spreading codes on TDM frames or timeslot intervals. In particular, the OCS 140 may be gain adjusted based on one or more TDM frames or timeslot boundaries. The one or more chaotic spreading codes Z(nT), $Y_1$(nT), $Y_2$(nT), . . . , $Y_S$(nT) are generated using parameters. The TDM-based transmitter 102 is configured for selectively modifying at least one parameter of a spreading code generation process used for one timeslot relative to the spreading code generation process used in other timeslots. Such parameters can include, but are not limited to, a sequence location parameter (described below in relation to FIGS. 6-8), a polynomial equation parameter (described below in relation to FIGS. 6-8), and an N-tuple of moduli parameter (described below in relation to FIGS. 6-8). The same chaotic sequence generator or a different chaotic sequence generator can be used for generating one or more such spreading codes.

If the parameter of a spreading code generation process is selected as the sequence location parameter, then TDM-based transmitter 102 can cyclically shift the chaotic spreading code $Y_i$(nT) by a different random number during at least two timeslots of the TDM frame (described below in relation to FIG. 2). If the parameter is selected as the polynomial equation parameter (e.g., a constant C) or an N-tuple of moduli (e.g., $m_0, \ldots, m_{N-1}$), then the TDM-based transmitter 102 can generate a different chaotic spreading code $Y_i$(nT) during at least two timeslots of the TDM frame (described below in relation to FIG. 2). As a result of the spreading sequence generation parameter changes, the OCS 140 is provided for selectively controlling access to the data which is transmitted during different timeslots.

The TDM-based transmitter 102 is further configured to transmit the OCS 140 to receivers 106, 108, 110. The OCS 140 can be transmitted from the TDM-based transmitter 102 over communications channel 104. Embodiments of the TDM-based transmitter 102 will be described below in relation to FIG. 4.

As shown in FIG. 1, the full permission receiver 106 is generally configured for receiving the OCS 140 transmitted from the TDM-based transmitter 102. The full permission receiver 106 is authorized to recover all data transmitted during all timeslots of the TDM frame (described below in relation to FIG. 2). In this regard, it should be understood that the full permission receiver 106 is configured for duplicating the complete set of data modulation and chaotic sequence parameter evolutions as performed by the TDM-based transmitter 102 in order to recover the signals with protected data $130_1$, $130_2$ (not shown in FIG. 1), . . . , $130_S$. In particular, the data is recovered by de-spreading the received signal 140 using a replica of the one or more chaotic spreading codes $Y_i$(nT) and de-modulating the de-spread signal to obtain data therefrom. The replica spreading code(s) is(are) synchronized in time and frequency with the chaotic spreading code(s) $Y_i$(nT). The full permission receiver 106 is also configured for processing the OSC 140 to recover the global data communication signal 126. An embodiment of full permission receiver 106 will be described below in relation to FIGS. 5A-5B.

The partial permission receiver 108 is generally configured for receiving OCS 140 transmitted from the TDM-based transmitter 102. The partial permission receiver 108 is authorized to recover only a proper subset of the protected data transmitted during the timeslots of the TDM frame (described below in relation to FIG. 2). The phrase "proper subset", as used herein, refers to a subset that cannot contain the whole set. A proper subset of a time-varying signal thus indicates that there exists a particular class of protected data, which may not be continuously transmitted, to which the partial permission receiver is not privy. By contrast, the phrase "subset", as used herein, refers to a selection of elements from an overall set and may consist of zero elements (a null set), any proper subset or as the entire set. In this regard, it should be understood that partial permission receiver 108 is configured for duplicating a proper subset of modulation parameters $X_i$ and chaotic sequence parameter $Y_i$ evolutions as performed by the TDM-based transmitter 102 in order to receive the corresponding proper subset of protected data signals during particular timeslots. Thereafter, de-modulation operations are performed to recover the portion of the data transmitted during the particular timeslots. The partial permission receiver 108 is also configured for processing the OCS 140 to recover the global data communication signal 126.

The global data only (GDO) receiver 110 is generally configured for receiving the OCS 140 transmitted from the TDM-based transmitter 102. The GDO receiver 110 is only authorized to recover data transmitted during timeslots of the TDM frame (described below in relation to FIG. 2) containing global data. In this regard, it should be understood that GDO receiver 110 is configured for duplicating only the set of data demodulation and chaotic sequence parameter evolutions corresponding to those performed by the TDM-based transmitter 102 in order to produce the GDCS 126 representing global data. In particular, the global data is recovered by de-spreading the received signal using a replica of the chaotic spreading code Z(nT) and de-modulating the de-spread signal to obtain global data therefrom. The replica spreading code is synchronized in time and frequency with the chaotic spreading code Z(nT).

It should be noted that the primary distinction between the full permission receiver 106, partial permission receiver 108, and GDO receiver 110 is the level of permitted access to protected data. In a preferred embodiment, each receiver 106, 108, 110 may consist of identical hardware, yet have their access permissions defined by a process similar to key management or timeslot scheduling algorithms. Key management processes and TDM timeslot scheduling algorithms are well known to those having ordinary skill in the art, and therefore will not be described herein. In other embodiments, the receiver hardware of the partial permission or GDO receivers 108, 110 may be altered to limit access to portions of the protected data by design. Still, embodiments of the present invention are not limited in this regard.

A person having ordinary skill in the art will appreciate that the communication system architecture of FIG. 1 is one exemplary communication system architecture. Embodiments of the present invention are not limited in this regard. For example, embodiments of the present invention can be implemented in communication systems having different architectures than that shown in FIG. 1. For example, the TDMA communication system depicted in FIG. 1 may be extended to a plurality of transmitters that each share the transmission channel 104 spectrum based on a pre-determined or evolving timeslot assignment or scheduling algorithm. Such scheduling algorithms are well known to those having ordinary skill in the art, and therefore will not be described herein. Additionally, the TDMA communication system depicted in FIG. 1 may be implemented as a directional TDMA (DTDMA) communication system employing directionality of antennas in the scheduling algorithm or as a TDMA adhoc network with multiple coordinated transmitters and receivers.

Figure 2:
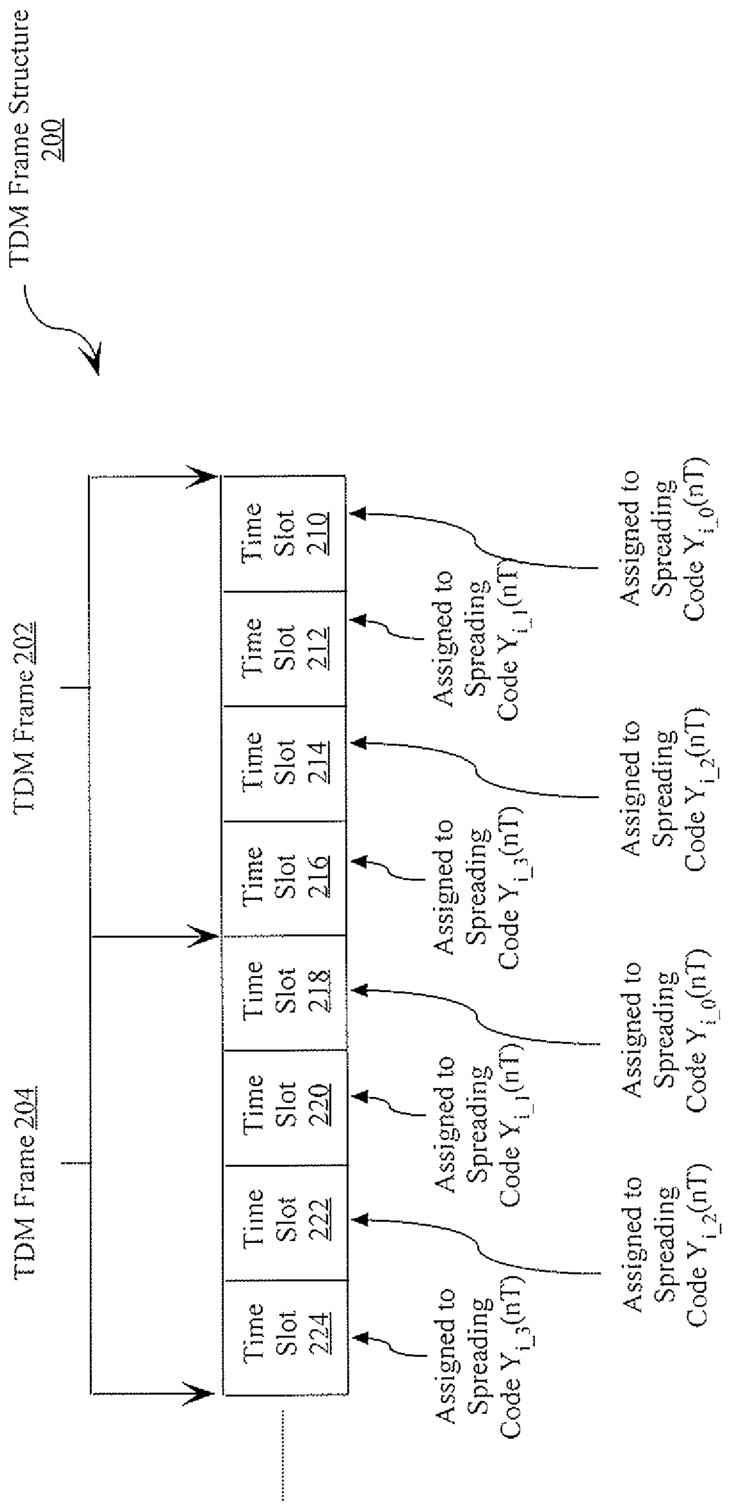
FIG. 2 is schematic illustration of a Time Division Multiplexing (TDM) frame structure that is useful for understanding the present invention.

Referring now to FIG. 2, there is provided a schematic illustration of an exemplary Time Division Multiplexing (TDM) frame structure 200 that is useful for understanding the present invention. As shown in FIG. 2, the TDM frame structure 200 is comprised of a plurality of TDM frames, such as TDM frames 202, 204. Each TDM frame 202, 204 is comprised of a plurality of timeslots. For example, TDM frame 202 comprises timeslots 210, 212, 214, 216. TDM frame 204 comprises timeslots 218, 220, 222, 224. Although the TDM frames 202, 204 are shown to have four (4) timeslots, embodiments of the present invention are not limited in this regard. TDM frames 202, 204 can have any number of timeslots selected in accordance with a particular communication system 100 application.

As shown in FIG. 2, the TDM frame structure 200 may be applied to any of the signals with protected data $\mathbf{130}_1$, $\mathbf{130}_2$, . . . , $\mathbf{130}_S$. Further, the TDM structure 200 chosen for each signal $\mathbf{130}_1$, $\mathbf{130}_2$, . . . , $\mathbf{130}_S$ may be chosen uniquely. For purposes of simplicity and clarity of discussion, only time division multiplexing of one (1) signal $\mathbf{130}_1$, $\mathbf{130}_2$, . . . , $\mathbf{130}_S$ is described herein.

As also shown in FIG. 2, each timeslot 210, . . . , 224 is assigned to a particular chaotic spreading code $Y_{i\_0}(nT)$, $Y_{i\_1}(nT)$, $Y_{i\_2}(nT)$, $Y_{i\_3}(nT)$. These chaotic spreading codes $Y_{i\_0}(nT)$, $Y_{i\_1}(nT)$, $Y_{i\_2}(nT)$, $Y_{i\_3}(nT)$ can be different chaotic spreading codes generated using distinct chaotic sequence generator parameters and/or cyclically shifted versions of the chaotic spreading code $Y_i(nT)$. For example, timeslot 210 is assigned to a chaotic spreading code $Y_{i\_0}(nT)$, which is the chaotic spreading code $Y_i(nT)$ cyclically shifted by zero (0). Timeslot 212 is assigned to a chaotic spreading code $Y_{i\_1}(nT)$, which is the chaotic spreading code $Y_i(nT)$ cyclically shifted by a first random number. Timeslot 214 is assigned to a chaotic spreading code $Y_{i\_2}(nT)$, which is the chaotic spreading code $Y_i(nT)$ cyclically shifted by a second random number. Timeslot 216 is assigned to a chaotic spreading code $Y_{i\_3}(nT)$, which is the chaotic spreading code $Y_i(nT)$ cyclically shifted by a third random number. At the end of TDM frame 202, the assignment order of chaotic sequences is repeated in TDM frame 204 in some embodiments. It should be noted that the chaotic sequences evolve in time, such that the use of the same sequence for timeslots 210, 218, will still result in apparently different spreading sequences. Embodiments of the present invention are not limited in this regard. The digital chaotic signals produced using a chaotic spreading codes $Y_{i\_0}(nT)$, $Y_{i\_1}(nT)$, $Y_{i\_2}(nT)$, $Y_{i\_3}(nT)$ are additively combined during each timeslot. The digital chaotic signals can also be combined with the global data communication signal 126 (described above in relation to FIG. 1) if present during the particular timeslot 210, . . . , 224.

A schematic illustration of exemplary spreading codes $Y_{i\_0}(nT)$, $Y_{i\_1}(nT)$, $Y_{i\_2}(nT)$, $Y_{i\_3}(nT)$ with offsets is provided in FIGS. 3A-3B. As shown in FIG. 3A, each of the chaotic spreading codes $Y_{i\_0}(nT)$, $Y_{i\_1}(nT)$, $Y_{i\_2}(nT)$, $Y_{i\_3}(nT)$ is the chaotic spreading code $Y_{i\_0}(nT)$ cyclically shifted a certain number of places to the right. For example, chaotic spreading code $Y_{i\_1}(nT)$, $Y_{i\_2}(nT)$, $Y_{i\_3}(nT)$ are the same chaotic sequence as chaotic spreading code $Y_{i\_0}(nT)$. However, the chaotic sequence of chaotic spreading code $Y_{i\_1}(nT)$ is cyclically shifted fifty-two (52) places to the right. Chaotic sequence of chaotic spreading code $Y_{i\_2}(nT)$ is cyclically shifted one-hundred fifty-two (152) places to the right. Chaotic sequence of chaotic spreading code $Y_{i\_3}(nT)$ is cyclically shifted twenty-five (25) places to the right.

In general, the sequence length "w" of a suitable pseudo-random number generator or digital chaotic sequence generator used in a spreading sequence will be substantially larger than the number of spreading code values that occur during a timeslot. In effect, the random shift selected by a scheduling algorithm or provided by an external device (not shown) may be extremely large. For example, digital chaotic circuits of sequence lengths "w" approaching one (1) googol (a one followed by 100 zeros) will never repeat in practical usage, thereby obfuscating any useful means of locating the sequence shift via brute force searches. Embodiments of the present invention are not limited in this regard. For example, the chaotic spreading codes $Y_{i\_0}(nT)$, $Y_{i\_1}(nT)$, $Y_{i\_2}(nT)$, $Y_{i\_3}(nT)$ can be cyclically shifted versions of a chaotic sequence, wherein the cyclic shifts are cyclic shifts to the right or cyclic shift to the left.

The chaotic spreading codes $Y_{i\_0}(nT)$, $Y_{i\_1}(nT)$, $Y_{i\_2}(nT)$, $Y_{i\_3}(nT)$ can be generalized as shown in FIG. 3B. In FIG. 3B, the terms "k1", "k2", and "k3" represent the initial condition for a chaotic sequence starting location. Notably, the rotation of indices can be provided using modulo operations. These modulo operations can be defined by the following mathematical expression: modulo s, where s is the total sequence length. These modulo operations can also be defined via modulo operations that employ portions of the Chinese Remainder Theorem to improve computational efficiency. Still, embodiments of the present invention are not limited in this regard. The terms "k1", "k2", and "k3" can be selected according to a random process.

Transmitter Architectures

Figure 4:
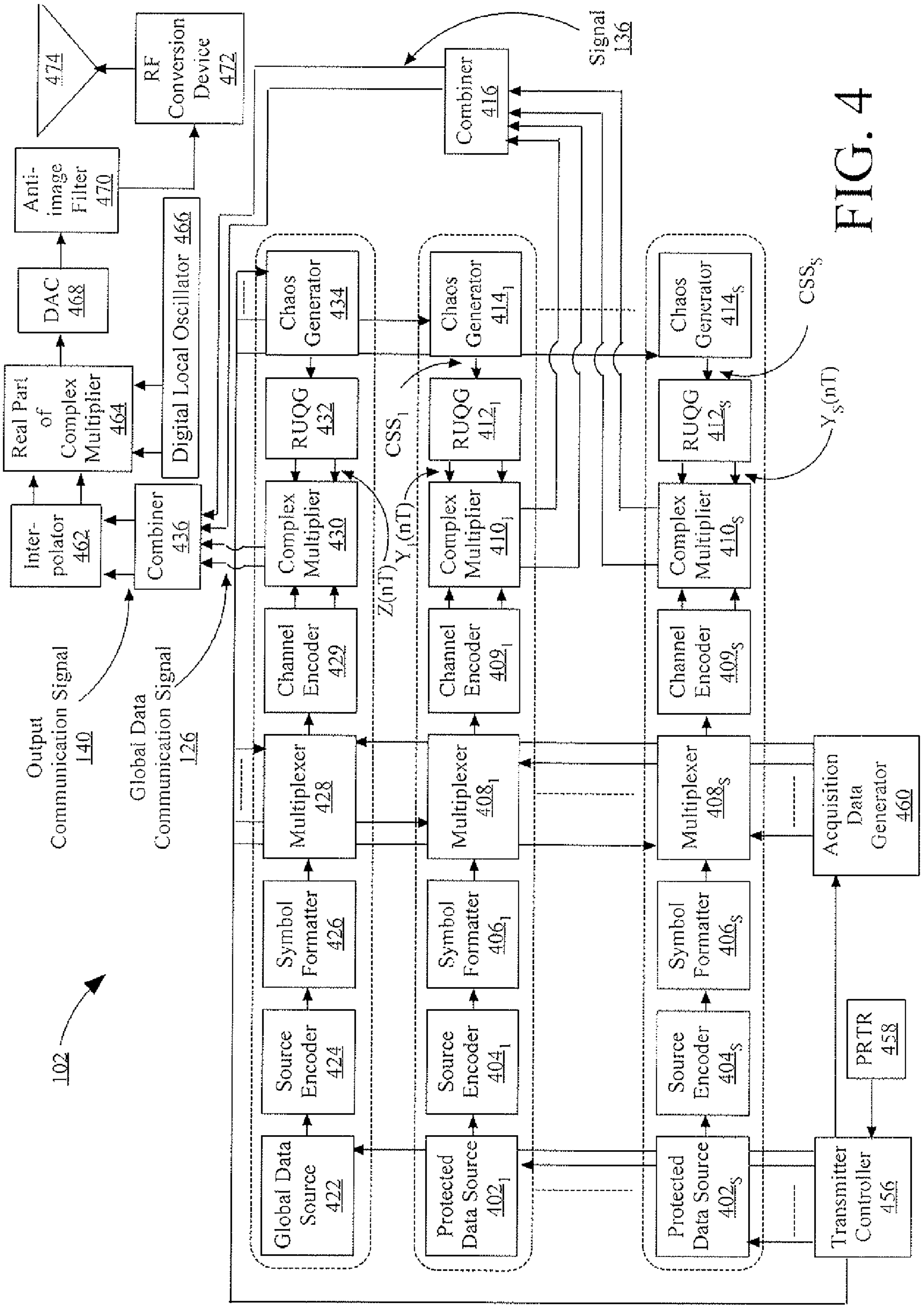
FIG. 4 is a more detailed block diagram of the transmitter of FIG. 1 that is useful for understanding the present invention.

Referring now to FIG. 4, there is provided a more detailed block diagram of TDM-based transmitter 102 shown in FIG. 1 that is useful for understanding the present invention. This embodiment of the TDM-based transmitter 102 assumes that: (1) no pulse shaping is applied to data symbols; (2) modulated data symbols are generated in quadrature form; and (3) chaotic spectral spreading is performed at an intermediate frequency (IF).

Referring again to FIG. 4, the TDM-based transmitter 102 is generally configured for generating quadrature amplitude-and-time-discrete baseband signals. The TDM-based transmitter 102 is also configured for spreading the quadrature amplitude-and-time-discrete baseband signals over a wide intermediate frequency band. This spreading consists of multiplying the quadrature amplitude-and-time-discrete baseband signals by a digital chaotic sequence. The products of these arithmetic operations are hereinafter referred to as digital chaotic signals. In this regard, it should be understood that the TDM-based transmitter 102 is also configured to process the digital chaotic signals to place the same in a proper analog form suitable for transmission over a communications channel 104 (described above in relation to FIG. 1). The TDM-based transmitter 102 is further configured to communicate analog chaotic signals to receivers 106, 108, 110 (described above in relation to FIG. 1) via the communications channel 104.

As shown in FIG. 4, the TDM-based transmitter 102 is comprised of protected data sources 402$_1$, . . . , 402$_S$, a global data source 422, source encoders 404$_1$, . . . , 404$_S$, 424, symbol formatters 406$_1$, . . . , 406$_S$, 426, multiplexers 408$_1$, . . . , 408$_S$, 428, channel encoders 409$_1$, . . . , 409$_S$, 429, complex multipliers 410$_1$, . . . , 410$_S$, 430, Real-Uniform statistics to Quadrature Gaussian statistics mapper (RUQG) 412$_1$, . . . , 412$_S$, 432, and chaos generators 414$_1$, . . . , 414$_S$, 434. The TDM-based transmitter 102 is also comprised of an Acquisition Data Generator (ADG) 460, transmitter controller 456, a Precision Real Time Reference (PRTR) 458, signal combiners 416, 436, an interpolator 462, real-part-of-complex multiplier 464, a quadrature digital local oscillator 466, a digital-to-analog converter (DAC) 468, an anti-image filter 470, an RF conversion device 472, and an antenna element 474.

Referring again to FIG. 4, the protected data sources 402$_1$, . . . , 402$_S$ are generally interfaces configured for receiving input signals containing data from external devices (not shown). As such, the protected data sources 402$_1$, . . . , 402$_S$ can be configured for receiving bits of data from the external data sources (not shown). The protected data sources 402$_1$, . . . , 402$_S$ can further be configured for supplying bits of data to source encoders 404$_1$, . . . , 404$_S$ at a particular data transfer rate.

It should be noted that each of the protected data sources 402$_1$, . . . , 402$_S$ is coupled to transmitter controller 456. The transmitter controller 456 is configured to communicate TDM timeslot information to each of the protected data sources 402$_1$, . . . , 402$_S$ for controlling when the protected data source 402$_1$, . . . , 402$_S$ accesses or transmits protected data. The transmitter controller 456 can be configured to communicate at least one different TDM parameter to the protected data sources 402$_1$, . . . , 402$_S$ during each timeslot of a TDM frame 202, 204 (described above in relation to FIG. 2).

Each of the source encoders 404$_1$, . . . , 404$_S$ is generally configured to encode data received from the respective protected data source 402$_1$, . . . , 402$_S$ using a forward error correction coding scheme. The bits of data received at or generated by the source encoder 404$_1$, . . . , 404$_S$ represents any type of information that may be of interest to a user of the system 100. For example, the data can be used to represent text, telemetry, audio, or video data. Each of the source encoders 404$_1$, . . . , 404$_S$ can further be configured to supply bits of data to a respective symbol formatter 406$_1$, . . . , 406$_S$ at a particular data transfer rate. It should be noted that any form of forward error correction algorithm or parameters may be used in the source encoders 404$_1$, . . . , 404$_S$. The forward error correction algorithms and parameters include, but are not limited to, Reed-Solomon algorithms with different t-values (indicating the number of correctable bytes) and various configurations of turbo codes. In some embodiments, the source encoders 404$_1$, . . . , 404$_S$ may be coupled to the transmitter controller 456 to change forward error correction algorithms or parameters according to a TDM frame or timeslot (described above in relation to FIG. 2). Embodiments of the present invention are not limited in this regard.

Each of the symbol formatters 406$_1$, . . . , 406$_S$ is generally configured to process bits of data for forming channel encoded symbols. The source encoded symbols are formatted into parallel words compatible with any type of quadrature amplitude-and-time-discrete modulation encoding. It should be noted that any form of modulation encoding may be used in the symbol formatters 406$_1$, . . . , 406$_S$. The formatted symbols include, but are not limited to, single bit words for BPSK symbols or 4-bit words for 16 QAM symbols. In some embodiments of the present invention, the symbol formatters 406$_1$, . . . , 406$_S$ may be coupled to the transmitter controller 456 to change symbol formats according to a TDM frame or timeslot (described above in relation to FIG. 2). Embodiments of the present invention are not limited in this regard. Each of the symbol formatters 406$_1$, . . . , 406$_S$ can further be configured for communicating the formatted symbol data to a respective multiplexers 408$_1$, . . . , 408$_S$.

According to embodiments of the present invention, the symbol formatters 406$_1$, . . . , 406$_S$ are functionally similar to a serial in/parallel out shift register where the number of parallel bits out is equal to log base two ($\log_2$) of the order of channel encoders 409$_1$, . . . , 409$_S$. According to other embodiments of the present invention, at least one of the symbol formatters 406$_1$, . . . , 406$_S$ is selected for use with a quadrature amplitude or phase shift keying modulator (e.g., QPSK modulator). As such, the symbol formatters 406$_1$, . . . , 406$_S$ is configured for performing a QPSK formatting function for grouping two (2) bits of data together to form a QPSK symbol data word (i.e., a single two bit parallel word). Thereafter, the symbol formatter 406$_1$, . . . , 406$_S$ communicates the formatted QPSK symbol data word to the respective multiplexer 408$_1$, . . . , 408$_S$. Embodiments of the present invention are not limited in this regard.

Referring again to FIG. 4, the ADG 460 is configured for generating a "known data preamble". The "known data preamble" can be a repetition of the same known symbol or a series of known symbols. The "known data preamble" can be used to enable initial synchronization of chaotic sequences generated in the TDM-based transmitter 102 and receiver 106, 108, 110 (described above in relation to FIG. 1). The duration of the "known data preamble" is determined by an amount required by a receiver 106, 108, 110 (described above in relation to FIG. 1) to synchronize with the TDM-based transmitter 102 under known worst case channel conditions. The ADG 460 is configured to receive configuration controls from the transmitter controller 456. The ADG 460 can be further configured for communicating the "known data preamble" to at least one of the multiplexers 408$_1$, . . . , 408$_S$.

Each of the multiplexers 408$_1$, . . . , 408$_S$ is generally configured to receive binary words (that are to be modulated by channel encoders 409$_1$, . . . , 409$_S$) from a respective symbol formatter 406$_1$, . . . , 406$_S$. Each of the multiplexers 408$_1$, . . . , 408$_S$ is also configured to receive the "known data preamble" from the ADG 460. The multiplexers 408$_1$, . . . , 408$_S$ are coupled to transmitter controller 456. As noted above, the transmitter controller 456 is configured for controlling the multiplexers 408$_1$, . . . , 408$_S$ so that the multiplexers 408$_1$, . . . , 408$_S$ route a portion of the data to channel encoders 409$_1$, . . . , 409$_S$ at the time of a new timeslot 210, . . . , 224. The transmitter controller 456 is also configured for controlling the multiplexers 408$_1$, . . . , 408$_S$ so that the multiplexers 408$_1$, . . . , 408$_S$ route the "known data preamble" to respective channel encoders 409$_1$, . . . , 409$_S$ upon command.

According to alternative embodiments of the present invention, the "known data preamble" is stored in a modulated form. In such a scenario, the architecture of FIG. 4 is modified such that the multiplexers 408$_1$, . . . , 408$_S$ exist after the channel encoders 409$_1$, . . . , 409$_S$. The "known data preamble" may also be injected at known intervals to aid in periodic resynchronization of chaotic sequences generated in the TDM-based transmitter 102 and receiver 106, 108, 110 (described above in relation to FIG. 1). This would typically be the case for an implementation meant to operate in harsh channel conditions. Still, embodiments of the present invention are not limited in this regard.

Referring again to FIG. 4, each of the multiplexers 408$_1$, . . . , 408$_S$ can be configured for selecting symbol data to be routed to a respective channel encoder $409_1, \ldots, 409_S$ after a preamble period has expired. Each of the multiplexers $408_1, \ldots, 408_S$ can also be configured for communicating symbol data to the respective channel encoder $409_1, \ldots, 409_S$. In this regard, it should be appreciated that a communication of the symbol data to the respective channel encoder $409_1, \ldots, 409_S$ is delayed by a time defined by the length of the "known data preamble." This delay allows all of a "known data preamble" to be fully communicated to respective channel encoder $409_1, \ldots, 409_S$ prior to communication of the symbol data.

Each of the channel encoders $409_1, \ldots, 409_S$ can be configured for performing actions to represent the "known data preamble" and the symbol data in the form of a modulated quadrature amplitude-and-time-discrete digital signal. The modulated quadrature amplitude-and-time-discrete digital signal is defined by digital words which represent intermediate frequency (IF) modulated symbols comprised of bits of data having a one (1) value or a zero (0) value. Methods for representing digital symbols by quadrature amplitude-and-time-discrete digital signal are well known to persons having ordinary skill in the art, and therefore will not be described herein. However, it should be appreciated that the channel encoders $409_1, \ldots, 409_S$ can employ any known method for representing digital symbols by quadrature amplitude-and-time-discrete digital signal. In some embodiments of the present invention, the channel encoders $409_1, \ldots, 409_S$ may communicate with the transmitter controller 456 to change modulation types or parameters according to a TDM frame or timeslot (described above in relation to FIG. 2). Each of the channel encoders $409_1, \ldots, 409_S$ is configured for communicating the modulated quadrature data signal to the respective complex multiplier $410_1, \ldots, 410_S$ According to embodiments of the present invention, the TDM-based transmitter 102 includes one or more sample rate matching devices (not shown) between the channel encoders $409_1, \ldots, 409_S$ and complex multipliers $410_1, \ldots, 410_S$. The sample rate matching device (not shown) can perform a sample rate increase on the quadrature amplitude-and-time-discrete signal so that a sample rate of the amplitude-and-time-discrete signal is the same as a digital chaotic sequence communicated to complex multipliers $410_1, \ldots, 410_S$. Still, embodiments of the present invention are not limited in this regard.

Referring again to FIG. 4, each of the complex multipliers $410_1, \ldots, 410_S$ is configured for performing a complex multiplication in the digital domain. In a complex multiplier $410_1, \ldots, 410_S$, the amplitude-and-time-discrete digital signal from a respective channel encoder $409_1, \ldots, 409_S$ is multiplied by a chaotic spreading code $Y_1(nT)$ $Y_2(nT)$ (not shown in FIG. 4), . . . , $Y_S(nT)$ received from a respective RUQG $412_1, \ldots, 412_S$. The chaotic spreading code $Y_1(nT)$ $Y_2(nT)$ (not shown in FIG. 4), . . . , $Y_S(nT)$ is generated by a respective RUQG $412_1, \ldots, 412_S$ and a respective chaos generator $414_1, \ldots, 414_S$. The complex multipliers $410_1, \ldots, 410_S$ are further configured for communicating the result of the complex multiplication operation to the combiner 416.

The chaos generators $414_1, \ldots, 414_S$ are generally configured for generating chaotic spreading sequences $CSS_1$, $CSS_2$ (not shown in FIG. 4), . . . , $CSS_S$ in accordance with the methods described below in relation to FIGS. 6-8. Accordingly, each of the chaos generators $414_1, \ldots, 414_S$ employs sets of polynomial equations, sets of constants and/or sets of relatively prime numbers as moduli for use in chaotic sequence generation. The rate at which the digital chaotic sequences $CSS_1$, $CSS_2$ (not shown in FIG. 4), . . . , $CSS_S$ are generated is a substantially higher rate than that of the data symbol rate. The greater the ratio between the data symbol period and the sample period of the digital chaotic sequences the higher a spreading gain.

Notably, each of the chaos generators $414_1, \ldots, 414_S$ can be configured for receiving chaotic sequence generation parameters from the transmitter controller 456. Such chaotic sequence generation parameters are described below in further detail. As a result, the chaos generator $414_1, \ldots, 414_S$ is configured to generate a different chaotic sequence or a cyclically shifted version of a chaotic sequence during different timeslots of a TDM frame 202, 204 (described above in relation to FIG. 2). Each of the chaos generators $414_1, \ldots, 414_S$ can also be configured for communicating chaotic sequences to a respective RUQG $412_1, \ldots, 412_S$.

Each of the RUQGs $412_1, \ldots, 412_S$ is generally configured for statistically transforming a chaotic sequence into a quadrature amplitude-and-time-discrete digital chaotic sequence with pre-determined statistical properties. The transformed digital chaotic sequence can have different word widths and/or different statistical distributions. For example, the RUQG $412_1, \ldots, 412_S$ may take in two (2) uniformly distributed real inputs from a respective chaos generator $414_1, \ldots, 414_S$ and convert those via a complex-valued bivariate Gaussian transformation to a quadrature output having statistical characteristics of a Gaussian distribution. Such conversion techniques are well understood by those having ordinary skill in the art, and therefore will not be described in herein. However, it should be understood that such conversion techniques may use nonlinear processors, look-up tables, iterative processing (CORDIC functions), or other similar mathematical processes. Each of the RUQGs $412_1, \ldots, 412_S$ is also configured for communicating statistically transformed chaotic sequences to a respective complex multiplier $410_1, \ldots, 410_S$.

According to embodiments of the present invention, each of the RUQGs $412_1, \ldots, 412_S$ statistically transforms a chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical equations (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where {u1, u2} are uniformly distributed independent input random variables and $\{G_1, G_2\}$ are Gaussian distributed output random variables. The invention is not limited in this regard. The output of the RUQG $412_1, \ldots, 412_S$ is the respective chaotic spreading code $Y_1(nT)$ $Y_2(nT)$ (not shown in FIG. 4), . . . , $Y_S(nT)$.

Referring again to FIG. 4, the combiner 416 is a signal combiner that additively combines the chaotically spread protected data signals from each of the complex multipliers $410_1, \ldots, 410_S$. As such, the combiner 416 is configured to receive complex-valued digital words from each of the complex multipliers $410_1, \ldots, 410_S$. Since each of the digital chaotic signals is generated using statistically orthogonal spreading codes $Y_1(nT)$, $Y_2(nT)$, . . . , $Y_S(nT)$, the digital chaotic signals may be separated using a synchronized chaotic sequence generated at receivers 106, 108. The combination of all digital chaotic signals is PDCS 136 (described above in relation to FIG. 1). The combiner 416 is also configured for communicating the PDCS 136 to the combiner 436.

Referring again to FIG. 4, GDCS 126 is generated in a substantially similar fashion to each of the digital chaotic signals. As such, the discussion above is sufficient to describe the creation of GDCS 126. In particular, components 422, 424, 426, 428, 429, 430, 432, 434 are substantially similar to the respective components $402_1, \ldots, 402_S$, $404_1, \ldots, 404_S$, $406_1, \ldots, 406_S$, $408_1, \ldots, 408_S$, $409_1, \ldots, 409_S$, $410_1, \ldots, 410_S$, $412_1, \ldots, 412_S$, $414_1, \ldots, 414_S$. The components 422, 424, 426, 428, 429, 430, 432, 434 are used to generate GDCS 126 that is communicated from the complex multiplier 430 to the combiner 436. It should be noted that in some embodiments of the present invention, components used to generate GDCS 126 can be configured to receive periodic changes to algorithms or parameters from the transmitter controller 456 according to a TDM frame or timeslot (described above in relation to FIG. 2).

The combiner 436 is generally configured for combining the GDCS 126 and the PDCS 136. In embodiments of the present invention, the combiner 436 additively combines the GDCS 126 and PDCS 136. The result of the complex-valued digital combination operation is a digital representation of a coherent chaotic sequence spread spectrum modulated IF signal (herein also referred to as "OCS 140"). OCS 140 comprises digital data that has been spread over a wide frequency bandwidth in accordance with the chaotic sequence generated by chaos generators $414_1, \ldots, 414_S$, 434. The combiner 436 is also configured to communicate the OCS 140 to interpolator 462 for subsequent transmission over the communications channel to receivers 106, 108, 110.

As shown in FIG. 4, the interpolator 462, real part of complex multiplier 464, and quadrature digital local oscillator 466 form at least one intermediate frequency (IF) translator. IF translators are well known to persons having ordinary skill in the art, and therefore will not be described herein. However, it should be understood that the components 462, 464, 466 can be collectively configured for frequency modulating a signal received from the combiner 436 to a sampled spread spectrum digital chaotic signal. The IF translator is configured for communicating the sampled spread spectrum digital chaotic signal to the DAC 468, wherein the sampled spread spectrum digital chaotic signal has an increased sampling rate and a non-zero intermediate frequency. The DAC 468 can be configured for converting the sampled spread spectrum digital chaotic signal to an analog signal. The DAC 468 can also be configured for communicating the analog signal to anti-image filter 470.

The anti-image filter 470 is configured for removing spectral images from the analog signal to form a smooth time domain signal. The anti-image filter 470 is also configured for communicating a smooth time domain signal to the RF conversion device 472. The RF conversion device 472 can be a wide bandwidth analog IF-to-RF up converter. The RF conversion device 472 is configured for forming an RF signal by centering a smooth time domain signal at an RF for transmission. The RF conversion device 472 is also configured for communicating RF signals to a power amplifier (not shown). The power amplifier (not shown) is configured for amplifying a received RF signal. The power amplifier (not shown) is also configured for communicating amplified RF signals to an antenna element 474 for communication to a receiver 106, 108, 110 (described above in relation to FIG. 1).

It should be understood that the digital generation of the digital chaotic sequences at the TDM-based transmitter 102 and receivers 106, 108, 110 (described above in relation to FIG. 1) is kept closely coordinated under the control of PRTR 458. If the accuracy of PRTR 458 is relatively high, then the synchronization of the chaos generators $414_1, \ldots, 414_S$, 434 of the the TDM-based transmitter 102 and the corresponding chaos generators of receivers 106, 108, 110 is relatively close. The PRTR 458 allows the states of the chaos generators to be easily controlled with precision.

Receiver Architectures

Figure 5A:
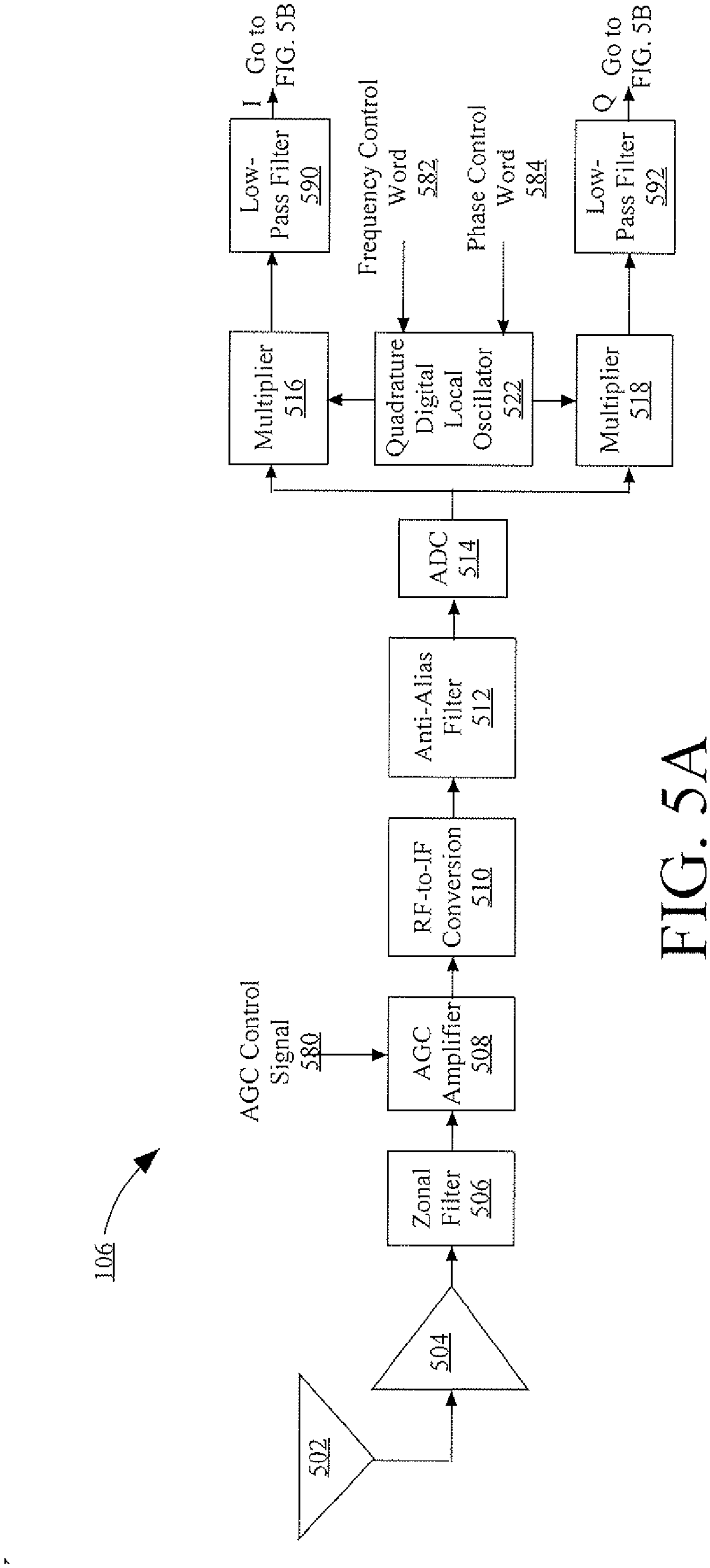
FIGS. 5A and 5B collectively provide a more detailed block diagram of the full permission receiver shown in FIG. 1 that is useful for understanding the present invention.
Figure 5B:
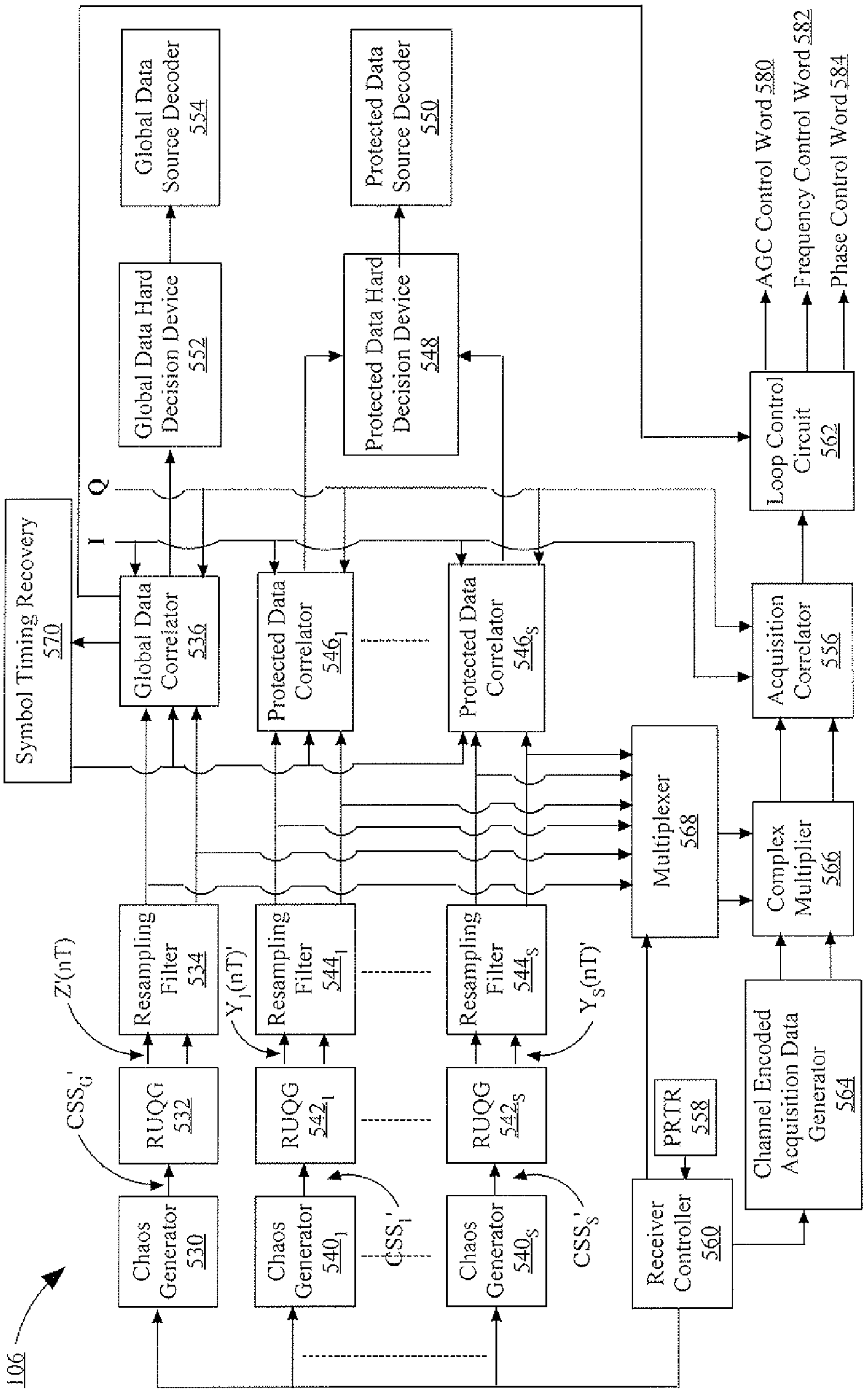

Referring now to FIGS. 5A-5B, there is provided a more detailed block diagram of receiver 106 of FIG. 1. Receiver 106 is generally configured for receiving transmitted OCS 140 from the TDM-based transmitter 102 (described above in relation to FIG. 1 and FIG. 4). It should be noted that the receivers 108 and 110 of FIG. 1 may have the same or substantially similar architecture as that shown in FIGS. 5A-5B. As such, the following description of the receiver 106 architecture is sufficient for understanding the architectures of receivers 108, 110. However, it should be noted that receiver 106 has all the keys for generating de-spreading all signal components of OCSs 140. Receiver 108 has keys for de-spreading portions of OCSs 140 transmitted during particular timeslots, but not all signal components. Receiver 110 has only the keys for de-spreading the global data portions of OCSs 140 transmitted during particular timeslots, corresponding to the GDCS 126. As should be understood, the "keys" can include, but are not limited to, chaotic sequence generation parameters used for generating a chaotic sequence at the transmitter during particular timeslots of a TDM frame 202, 204 (described above in relation to FIG. 2).

Receiver 106 is also generally configured for down converting and digitizing a received analog chaotic signal. As shown in FIG. 5A, receiver 106 comprises an antenna element 502, a low noise amplifier (LNA) 504, a zonal filter 506, an automatic gain control (AGC) amplifier 508, a Radio Frequency to Intermediate Frequency (RF-to-IF) conversion device 510, an anti-alias filter 512 and an analog-to-digital (A/D) converter 514. Receiver 106 further includes a quadrature digital local oscillator (QDLO) 522, frequency control word 582, phase control word 584 and lowpass filters 590, 592. As shown in FIG. 5B, receiver 106 further comprises a channel encoded acquisition data generator (CEADG) 564, a symbol timing recovery circuit 570, a receiver controller 560, and a PRTR 558. Receiver 106 also includes one or more correlators 536, $546_1, \ldots, 546_S$, acquisition correlator, 556, protected data decision device 548, global data decision device 552, protected data source decoder 550, global data source data decoder 554, and complex multiplier 566. Receiver 106 further comprises one or more chaos generators 530, $540_1, \ldots, 540_S$, RUQGs 532, $542_1, \ldots, 542_S$, resampling filters 534, $544_1, \ldots, 544_S$, multiplexer 568 and loop control circuit 562. It should be noted that the functions of the RUQGs 532, $542_1, \ldots, 542_S$, can be performed by the chaos generators 530, $540_1, \ldots, 540_S$. In such a scenario, receiver 106 is absent of the RUQG(s) 532, $542_1, \ldots, 542_S$.

Antenna element 502 is generally configured for receiving an analog input signal communicated from a transmitter (e.g., transmitter 102 described above in relation to FIG. 1 and FIG. 4) over a communications link (e.g., communications link 104 described above in relation to FIG. 1). Antenna element 502 can also be configured for communicating the analog input signal to the LNA 504. LNA 504 is generally configured for amplifying a received analog input signal while adding as little noise and distortion as possible. LNA 504 can also be configured for communicating an amplified, analog input signal to zonal filer 506. Zonal filter 506 is configured for suppressing large interfering signals outside of bands of interest. Zonal filter 506 can also be configured for communicating filtered, analog input signals to the AGC amplifier 508. AGC amplifier 508 is generally a controllable gain amplifier configured for adjusting a gain of an analog input signal. The AGC amplifier is configured to accept a signal from the zonal filter 506 and the AGC control signal 580. AGC amplifier 508 is configured for communicating gain adjusted, analog input signals to the RF-to-IF conversion device 510.

RF-to-IF conversion device 510 is generally configured for mixing an analog input signal to a particular IF. RF-to-IF conversion device 510 is also configured for communicating mixed analog input signals to anti-alias filter 512. Anti-alias filter 512 is configured for restricting a bandwidth of a mixed analog input signal. Anti-alias filter 512 is also configured for communicating filtered, analog input signals to A/D converter 514. A/D converter 514 is configured for converting received analog input signals to digital signals. A/D converter 514 is also configured for communicating digital input signals to multipliers 516, 518.

Receiver 106 can also be configured for obtaining protected data encoded in the PDCS 136 from the transmitted analog chaotic signal by correlating it with a replica of the chaotic sequences generated by chaos generators $\mathbf{414}_1, \ldots, \mathbf{414}_S$ of the transmitter (e.g., transmitter 102 described above in relation to FIG. 1 and FIG. 4). Similarly, receiver 106 can be configured for obtaining global data encoded in the GDCS 126 from the transmitted analog chaotic signal by correlating it with a replica of the chaotic sequences generated by chaos generator 434 of the transmitter (e.g., transmitter 102 described above in relation to FIG. 1 and FIG. 4). The global data can be converted into text, sound, pictures, navigational-position information, and/or any other type of useful payload information that can be communicated. Likewise, the protected data can be converted into text, sound, pictures, navigational-position information, and/or any other type of useful payload information that can be communicated.

Notably, receiver 106 of FIGS. 5A-5B is designed to eliminate the drawbacks of conventional analog based coherent chaotic communications systems. In this regard, it should be understood that analog chaos circuits of conventional analog based coherent chaotic communications systems are synchronized by periodically exchanging state information. The exchange of state information requires a substantial amount of additional bandwidth. In contrast, receiver 106 is configured to synchronize strings of discrete time chaotic samples (i.e., chaotic sequences) without using a constant or periodic transfer of state update information. This synchronization feature of receiver 106 will become more apparent as the discussion progresses.

QDLO 522 shown in FIG. 5A is generally configured for generating a complex quadrature amplitude-and-time-discrete digital sinusoid at a given frequency. The digital sinusoid can be generated using a binary phase control word 584 and a binary frequency control word 582 received from the loop control circuit 562. QDLO 522 is also configured for communicating digital words representing in-phase components of the digital sinusoid to the complex multiplier 516. QDLO 522 is further configured for communicating digital words representing quadrature-phase components of the digital sinusoid to the complex multiplier 518.

Complex multiplier 516 is configured for receiving digital words from the A/D converter 514 and digital words from the in-phase component of the QDLO 522. Complex multiplier 516 is also configured for generating digital output words by multiplying digital words from A/D converter 514 by digital words from the QDLO 522. Complex multiplier 516 is further configured for communicating real data represented as digital output words to lowpass filter 590.

Complex multiplier 518 is configured for receiving digital words from A/D converter 514 and digital words from the quadrature-phase component of the QDLO 522. Complex multiplier 518 is also configured for generating digital output words by multiplying the digital words from A/D converter 514 by the digital words from QDLO 522. Complex multiplier 518 is further configured for communicating imaginary data represented as digital output words to lowpass filter 592.

Lowpass filter 590 is configured to receive the real digital data from multiplier 516 and lowpass filter the real data to generate the in-phase digital data component of the quadrature baseband form of the received signal. Lowpass filter 590 is further configured to communicate the in-phase digital output words to acquisition correlator 556 and correlators 536, $\mathbf{546}_1, \ldots, \mathbf{546}_S$. Lowpass filter 592 is configured to receive the imaginary digital data from multiplier 518 and lowpass filter the imaginary data to generate the quadrature-phase digital data component of the quadrature baseband form of the received signal. Lowpass filter 592 is further configured to communicate the in-phase digital output words to acquisition correlator 556 and correlators 536, $\mathbf{546}_1, \ldots, \mathbf{546}_S$.

It should be noted that the functional blocks hereinafter described in FIG. 5B represent three channel devices in the sense that the same or similar functions are being performed concurrently for purposes of extracting global data and protected data. In this regard, it will be recalled that PDCS 136 includes digital chaotic signals representing data provided by protected data sources $\mathbf{402}_1, \ldots, \mathbf{402}_S$ (described in relation to FIG. 4 above) and that GDCS 126 includes a digital chaotic signal representing data provided by global data source 422 (described in relation to FIG. 4 above).

Complex correlators 536, $\mathbf{546}_1, \ldots, \mathbf{546}_S$ are configured for performing complex correlations in the digital domain. Each of the complex correlators 536, $\mathbf{546}_1, \ldots, \mathbf{546}_S$ can generally involve multiplying digital words received from multipliers 516, 518 (filtered by lowpass filters 590, 592) by digital words representing a chaotic sequence. Each of the complex correlators 536, $\mathbf{546}_1, \ldots, \mathbf{546}_S$ is also configured for computing a complex sum of products with staggered temporal offsets. The chaotic de-spreading codes Z'(nT), $Y_1$'(nT), . . . , $Y_S$'(nT) are generated by chaos generators 530, $\mathbf{540}_1, \ldots, \mathbf{540}_S$ and RUQGs 532, $\mathbf{542}_1, \ldots, \mathbf{542}_S$. It should be noted that each chaotic de-spreading codes is a replica of a chaotic spreading code used to generate a signal at the TDM-based transmitter 102 (described above in relation to FIG. 1 and FIG. 4). Each chaotic de-spreading code used to de-spread protected data is synchronized in time and frequency with the corresponding chaotic spreading code generated by the respective chaos generator and RUQG of the TDM-based transmitter (e.g., transmitter 102 described above in relation to FIG. 1 and FIG. 4).

The primary difference between the full permission receiver 106, partial permission receiver 108 and global data only receiver 110 is the selection of keys or other chaotic sequence generation parameters available to re-create the synchronized chaotic de-spreading codes $Y_1$'(nT), . . . , $Y_S$'(nT). The full permission receiver 106 is capable of generating all of the chaotic de-spreading codes $Y_1$'(nT), . . . , $Y_S$'(nT). The partial permission receiver 108 is capable of generating a proper subset of the chaotic de-spreading codes $Y_1$'(nT), . . . , $Y_S$'(nT). The global data only receiver 110 is capable of generating none of the chaotic de-spreading codes $Y_1$'(nT), . . . , $Y_S$'(nT). All receivers 106, 108, 110 are capable of generating the chaotic de-spreading code Z'(nT).

The plurality of chaotic spreading codes Z'(nT), $Y_1$'(nT), . . . , $Y_S$'(nT) are generally generated in accordance with the methods described below in relation to FIGS. 7-8. Accordingly, chaos generators 530, 540$_1$, . . . , 540$_S$ employ sets of polynomial equations, sets of constants, and/or sets of relatively prime numbers as modulus for use in chaotic sequence generations. Chaos generators 530, 540$_1$, . . . , 540$_S$ can be configured for receiving initial conditions from receiver controller 560. The initial conditions define arbitrary sequence starting locations, i.e., the number of places (e.g., zero, one, two, etc.) that chaotic de-spreading codes Z'(nT), $Y_1$'(nT), . . . , $Y_S$'(nT) are to be cyclically shifted. The initial conditions will be described below in relation to step 714 of FIG. 7.

Chaos generator 530 is configured for communicating a chaotic sequence $CSS_G$' to the RUQG 532. Each of the chaos generators 540$_1$, . . . , 540$_S$ is configured for communicating a chaotic sequence $CSS_1$', . . . , $CSS_S$' to the respective RUQG 542$_1$, . . . , 542$_S$. In this regard, it should be appreciated that the chaos generators 530, 540$_1$, . . . , 540$_S$ are coupled to the receiver controller 560. The receiver controller 560 is configured to control chaos generators 530, 540$_1$, . . . , 540$_S$ so that chaos generators 530, 540$_1$, . . . , 540$_S$ generate chaotic sequences $CSS_G$', $CSS_1$', . . . , $CSS_S$' with the correct initial state when receiver 106 is in an acquisition mode and a tracking mode.

The RUQGs 532, 542$_1$, . . . , 542$_S$ are configured for statistically transforming digital chaotic sequences into transformed digital chaotic de-spreading codes Z'(nT), $Y_1$'(nT), . . . , $Y_S$'(nT). Each of the chaotic spreading codes Z'(nT), $Y_1$'(nT), . . . , $Y_S$'(nT) has a characteristic form. The characteristic form can include, but is not limited to, real, complex, quadrature, and combinations thereof. Each of the de-spreading codes Z'(nT), $Y_1$'(nT), . . . , $Y_S$'(nT) can have different word widths and/or different statistical distributions. The RUQGs 532, 542$_1$, . . . , 542$_S$ are also configured for communicating transformed chaotic sequences to re-sampling filters 534, 544$_1$, . . . , 544$_S$.

According to embodiments of the present invention, the RUQGs 532, 542$_1$, . . . , 542$_S$ are configured for statistically transforming digital chaotic sequences into quadrature Gaussian forms of the digital chaotic sequences. The RUQGs 532, 542$_1$, . . . , 542$_S$ are also configured for communicating quadrature Gaussian form of the digital chaotic de-spreading codes Z'(nT), $Y_1$'(nT), . . . , $Y_S$'(nT) to the re-sampling filters 534, 544$_1$, . . . , 544$_S$, respectively. More particularly, the RUQGs 530, 542$_1$, . . . , 542$_S$ communicate in-phase ("I") data and quadrature phase ("Q") data to the re-sampling filters 534, 544$_1$, . . . , 544$_S$. Embodiments of the present invention are not limited in this regard.

Referring again to FIG. 5B, the re-sampling filters 534, 544$_1$, . . . , 544$_S$ are configured for forwarding transformed chaotic sequences to the complex correlators 536, 546$_1$, . . . , 546$_S$, and multiplexer 568. The re-sampling filters 534, 544$_1$, . . . , 544$_S$ are also configured for making chaos sample rates compatible with a received signal sample rate when receiver 106 is in acquisition mode. The re-sampling filters 534, 544$_1$, . . . , 544$_S$ are further configured to compensate for transmit and receive clock offsets with less than a certain level of distortion when receiver 106 is in a steady state demodulation mode. In this regard, it should be appreciated that the re-sampling filters 534, 544$_1$, . . . , 544$_S$ are configured for converting the sampling rates of in-phase ("I") and quadrature-phase ("Q") data sequences from first sampling rates to second sampling rates without changing the spectrum of the data contained therein.

If a sampled form of a chaotic de-spreading codes Z'(nT), $Y_1$'(nT), . . . , $Y_S$'(nT) is thought of as discrete samples of a continuous band limited chaos then the re-sampling filters 534, 544$_1$, . . . , 544$_S$ are effectively tracking the discrete time samples, computing continuous representations of the chaotic sequences, and re-sampling the chaotic sequences at the discrete time points required to match the discrete time points sampled by the A/D converter 514. In effect, input values and output values of each re-sampling filter 534, 544$_1$, . . . , 544$_S$ are not exactly the same because the values are samples of the same waveform taken at slightly offset times. However, the values are samples of the same waveform so the values have the same power spectral density.

In embodiments of the present invention, components used to generate the chaotic de-spreading sequences can be configured to receive periodic changes to algorithms or parameters from the receiver controller 560 according to a TDM frame or timeslot (described above in relation to FIG. 2). Still, embodiments of the present invention are not limited in this regard.

Referring again to FIG. 5B, multiplexer 568 is configured to receive chaotic sequences from the resampling filters 534, 544$_1$, . . . , 544$_S$. The multiplexer 568 is also configured to select a plurality of chaotic de-spreading codes received from resampling filters 534, 544$_1$, . . . , 544$_S$ that are to be passed on to the complex multiplier 566. The multiplexer 566 is further configured to receive indication of which chaotic de-spreading code(s) are to be selected from the receiver controller 560 according to a TDM frame or timeslot (described above in relation to FIG. 2). For purposes of simplicity and clarity of discussion, the output of multiplexer 568 is discussed as a single chaotic sequence. It should be noted, however, that in some embodiments of the present invention, a complex-valued adder (not shown) may be included between the multiplexer 568 and complex multiplier 566. The complex-valued adder can be provided to add a plurality of selected chaotic spreading code(s) together according to a TDM frame or timeslot (described above in relation to FIG. 2) prior to communicating the result to the complex multiplier 566. Still, embodiments of the present invention are not limited in this regard.

Referring again to FIG. 5B, the CEADG 564 is configured for generating modulated acquisition sequences. The CEADG 564 is also configured for communicating modulated acquisition sequences to the complex multiplier 566. The complex multiplier 566 is configured to receive a chaotic sequence from multiplexer 568 and modulated acquisition sequences from the CEADG 564. The complex multiplier 566 is also configured for performing complex multiplications in the digital domain to yield references for the digital input signal. Each of the complex multiplications can involve multiplying a modulated acquisition sequence received from the CEADG 564 by a digital representation of a global chaotic sequence. The complex multiplier 566 is further configured for communicating reference signals to the acquisition correlator 556.

The correlators 536, 546$_1$, . . . , 546$_S$ are configured to correlate locally generated chaotic signals with the received OSC 140 to recover the protected data and global data. When properly aligned with symbol timing, the correlator 536 de-spreads the GDCS 126 by correlating the OCS 140 with the locally generated replica of chaotic spreading code Z(nT). The correlator 546$_i$ de-spreads the PDCS 136 by correlating the OCS 140 with the locally generated replica of chaotic spreading code(s) $Y_1$(nT), . . . , $Y_S$(nT). In this regard, it should be understood that the sense of the real and imaginary components of the correlations is directly related to the values of the real and imaginary components of the symbols of a digital input signal. It should also be understood that the magnitudes relative to a reference magnitude of the real and imaginary components of the correlation can be directly related to the magnitude values of the real and imaginary components of the amplitude modulated symbols of a digital input signal. The reference value is dependent on the processing gain of the correlator, the gain control value, and the overall gain of the receiver signal processing chain. Methods for calculating a reference magnitude are known to those having ordinary skill in the art, and therefore will not be discussed in detail herein. Thus, the data recovery correlators include both phase and magnitude components of symbol soft decisions. The phrase "soft decisions", as used herein, refers to soft-values (which are represented by soft-decision bits) that comprise information about the bits contained in a sequence. Soft-values are values that represent the probability that a particular symbol is an allowable symbol. For example, a soft-value for a particular binary symbol can indicate that a probability of a bit being a one (1) is p(1)=0.3. Conversely, the same bit can have a probability of being a zero (0) which is p(0)=0.7.

Similarly, at least one of the correlators 536, 546$_1$, . . . , 546$_S$ is configured to facilitate symbol timing tracking. For example, correlator 536 is configured for correlating a locally generated replica of the chaotic spreading code Z(nT) used to de-spread GDCS 126 with a digital input signal on the assumed symbol boundaries, advanced symbol boundaries, and retarded symbol boundaries. In this regard, it should be understood that, the sense and magnitude of the real and imaginary components of the correlation is directly related to the time offsets of the real and imaginary components of the symbols relative to actual boundaries. This symbol tracking technique is well known to those having ordinary skill in the art, and therefore will not be discussed in detail herein. It should also be understood that this symbol time tracking method is only one of a number of methods known to those skilled in the art and does not limit the scope of the present invention in any way.

The correlator 536 is also configured to communicate advanced, on time, and retarded correlation information to the symbol timing recovery device 570. The correlator 536 is further configured for communicating soft decisions to a global data hard decision device 552 for final symbol decision making. The global data hard decision device 552 is configured for communicating symbol decisions to a global data source decoder 554. The global data source decoder 554 is configured for converting symbols to a binary form and decoding any FEC applied at a transmitter (e.g., transmitter 102 described above in relation to FIG. 1 and FIG. 4). The global data source decoder 554 is also configured for passing decoded bit streams to one or more external devices (not shown) utilizing the decoded global data.

Each of the correlators 546$_1$, . . . , 546$_S$, is also configured for communicating soft decisions to a protected data hard decision device 548 for final symbol decision making. The protected data hard decision device 548 is configured for communicating symbol decisions to a protected data source decoder 550. The protected data source decoder 550 is configured for converting symbols to a binary form and decoding any FEC applied at a transmitter (e.g., transmitter 102 described above in relation to FIG. 1 and FIG. 4). The protected data source decoder 550 is also configured for passing decoded bit streams to one or more external devices (not shown) utilizing the decoded protected data.

The acquisition correlator 556 is generally configured for acquiring initial timing information associated with a chaotic sequence and initial timing associated with a data sequence. The acquisition correlator 556 is further configured for acquiring initial phase and frequency offset information between a chaotic sequence and a digital input signal. Methods for acquiring initial timing information are well known to persons having ordinary skill in the art, and therefore will not be described herein. Similarly, methods for acquiring initial phase/frequency offset information are well known to persons having ordinary skill in the art, and therefore will not be described herein. However, it should be appreciated that any such method for acquiring initial timing information and/or for tracking phase/frequency offset information can be used without limitation.

The acquisition correlator 556 is configured for communicating magnitude and phase information as a function of time to the loop control circuit 562. Loop control circuit 562 is configured for using magnitude and phase information to calculate a deviation of an input signal magnitude from a nominal range and to calculate timing, phase, and frequency offset information. The calculated information can be used to synchronize a chaotic sequence with a digital input signal. Loop control circuit 562 is also configured for communicating phase/frequency offset information to the QDLO 522 and for communicating gain deviation compensation information to the AGC amplifier 508. Loop control circuit 520 is further configured for communicating retiming control signals to chaos generators 530, 540$_1$, . . . , 540$_S$.

PRTR 558 is the same as or substantially similar to the PRTR 458 of FIG. 4. The description provided above in relation to the PRTR 458 is sufficient for understanding the PRTR 558 of FIG. 5B.

The operation of the receiver 106 will now be briefly described with regard to an acquisition mode and a steady state demodulation mode.

Acquisition Mode:

In acquisition mode, the re-sampling filters 534, 544$_1$, . . . , 544$_S$ perform a rational rate change and forwards a transformed chaotic de-spreading codes to a multiplexer 568. The multiplexer 568 selects the chaotic de-spreading code as configured by the receiver controller 560 according to a TDM frame or timeslot (described above in relation to FIG. 2). The CEADG 564 generates a modulated acquisition sequence and forwards the same to a particular digital complex multiplier 566. The complex multiplier 566 performs a complex multiplication in the digital domain. In the complex multiplier 566, a modulated acquisition sequence from the CEADG 564 is multiplied by a chaotic de-spreading code to yield a reference for a digital input signal that was generated at a transmitter (e.g., transmitter 102 described above in relation to FIG. 1 and FIG. 4) to facilitate initial acquisition. The chaotic de-spreading code is generated by a respective chaos generator 530, 540$_1$, . . . , 540$_S$ and RUQG 532, 542$_1$, . . . , 542$_S$. The complex multiplier 566 communicates a reference signal to the acquisition correlator 556. In this search mode, the acquisition correlator 556 searches across an uncertainty window to locate a received signal state so that chaos generators 530, 540$_1$, . . . , 540$_S$ can be set with the time synchronized state vector. It should be noted that acquisition modes occur according to a TDM frame or timeslot (described above in relation to FIG. 2), with the full permission receiver 106 being capable of receiving all global and protected data transmitted from the TDM-based transmitter 102. The assignment of timeslots within TDM frames for specific types of data content and associated users is coordinated with the TDM-based transmitter 102 via TDM scheduling algorithms. Such scheduling algorithms are well known by those of ordinary skill in the art, and therefore will not be described in detail herein. However, it should be noted that at the beginning of each assigned timeslot that the receiver 106 is scheduled to receive data. The receiver 106 will begin acquisition processing using the appropriate chaotic sequence parameters.

The partial permission receiver 108 differs from the full permission receiver 106 in that not all protected data content is permitted to be accessed. As such, only a proper subset of the chaotic de-spreading codes $Y_1'(nT), \ldots, Y_S'(nT)$ will be activated during a particular timeslot, preventing reception and processing of unintended protected data. The partial permission receiver 108 may however have permission to access a portion of the protected data transmitted during a scheduled timeslot, thereby performing acquisition processing using at least one permitted chaotic de-spreading code. The scheduling algorithm that underlies the TDM communication system includes knowledge of which receivers are permitted access to particular classes of data.

The GDO receiver 110 differs from the full permission receiver 106 in that none of the protected data content is permitted to be accessed. As such, only the chaotic de-spreading code Z'(nT) may be selected by multiplexer 568 for communication to complex multiplier 566. The GDO receiver 110 has permission to access the global data during scheduled timeslots, therefore performing acquisition processing using only the chaotic de-spreading code Z'(nT). The scheduling algorithm that underlies the TDM communication system includes knowledge of which receivers are permitted access to particular classes of data. During timeslots where the GDO receiver 110 does not have any assigned global data transmissions, the GDO receiver 110 has no need to perform acquisition processing, similar to the case for receivers 106, 108, 110 during timeslots when no assigned data is transmitted.

Steady State Demodulation Mode:

In steady state demodulation mode, the correlator 536 tracks the correlation between the received modulated signal and the locally generated chaotic sequences close to the nominal correlation peak to generate magnitude and phase information as a function of time. This information is passed to the loop control circuit 562. Loop control circuit 562 applies appropriate algorithmic processing to this information to extract phase offset, frequency offset, and magnitude compensation information. The correlator 536 also passes its output information, based on correlation times terminated by symbol boundaries, to a symbol timing recovery circuit 570 and global data hard decision device 552.

Loop control circuit 562 monitors the output of the global data correlator 536. When loop control circuit 562 detects fixed correlation phase offsets, the phase control of QDLO 522 is modified to remove the phase offset. When loop control circuit 562 detects phase offsets that change as a function of time, it adjusts re-sampling filters 534, $\mathbf{544}_1, \ldots, \mathbf{544}_S$ which act as incommensurate re-samplers when receiver 106 is in steady state demodulation mode or the frequency control of QDLO 522 is modified to remove frequency or timing offsets.

When the correlator's 536 output indicates that the received digital input signal timing has "drifted" more than plus or minus a half (½) of a sample time relative to a locally generated chaotic sequence, loop control circuit 562 (1) adjusts a correlation window in an appropriate temporal direction by one sample time, (2) advances or retards a state of the local chaos generators 740, 760 by one iteration state, and (3) adjusts re-sampling filters 534, $\mathbf{544}_1, \ldots, \mathbf{544}_S$ to compensate for the time discontinuity. This loop control circuit 562 process keeps the chaos generators 434, $\mathbf{414}_1, \ldots, \mathbf{414}_S$ of the transmitter (e.g., transmitter 102 described above in relation to FIG. 1 and FIG. 4) and the chaos generators 530, $\mathbf{540}_1, \ldots, \mathbf{540}_S$ of the receiver 106 synchronized to within half (½) of a sample time.

If a more precise temporal synchronization is required to enhance performance, a re-sampling filter can be implemented as a member of the class of polyphase fractional time delay filters. This class of filters is well known to persons having ordinary skill in the art, and therefore will not be described herein.

As described above, a number of chaotic samples are combined with an information symbol at the TDM-based transmitter 102. Since the TDM-based transmitter 102 and receiver 106 timing are referenced to two (2) different precision real time reference clocks 458, 558, symbol timing must be recovered at the receiver 106 to facilitate robust demodulation. In another embodiment, symbol timing recovery can include: (1) multiplying a received input signal by a complex conjugate of a locally generated chaotic sequence using a complex multiplier; (2) computing an "N" point running average of the product where "N" is a number of chaotic samples per symbol time; (3) storing the values, the maximum absolute values of the running averages and the time of occurrence; and (4) statistically combining the values at the symbol timing recovery circuit 570 to recover symbol timing.

In this steady state demodulation mode, the symbol timing recovery circuit 570 communicates symbol onset timing to correlators 536, $\mathbf{546}_1, \ldots, \mathbf{546}_S$ for controlling an initiation of a symbol correlation. The correlators 536, $\mathbf{546}_1, \ldots, \mathbf{546}_S$ correlate a locally generated chaotic sequence with a received digital input signal during symbol duration. The sense and magnitude of real and imaginary components of the correlation are directly related to the values of the real and imaginary components of symbols of a digital input signal. Accordingly, the correlators 536, $\mathbf{546}_1, \ldots, \mathbf{546}_S$ generates symbol soft decisions. These soft symbol decisions are communicated to the global data hard decision device 552 as described previously.

Chaos Generators and Digital Chaotic Sequence Generation

Figure 6:
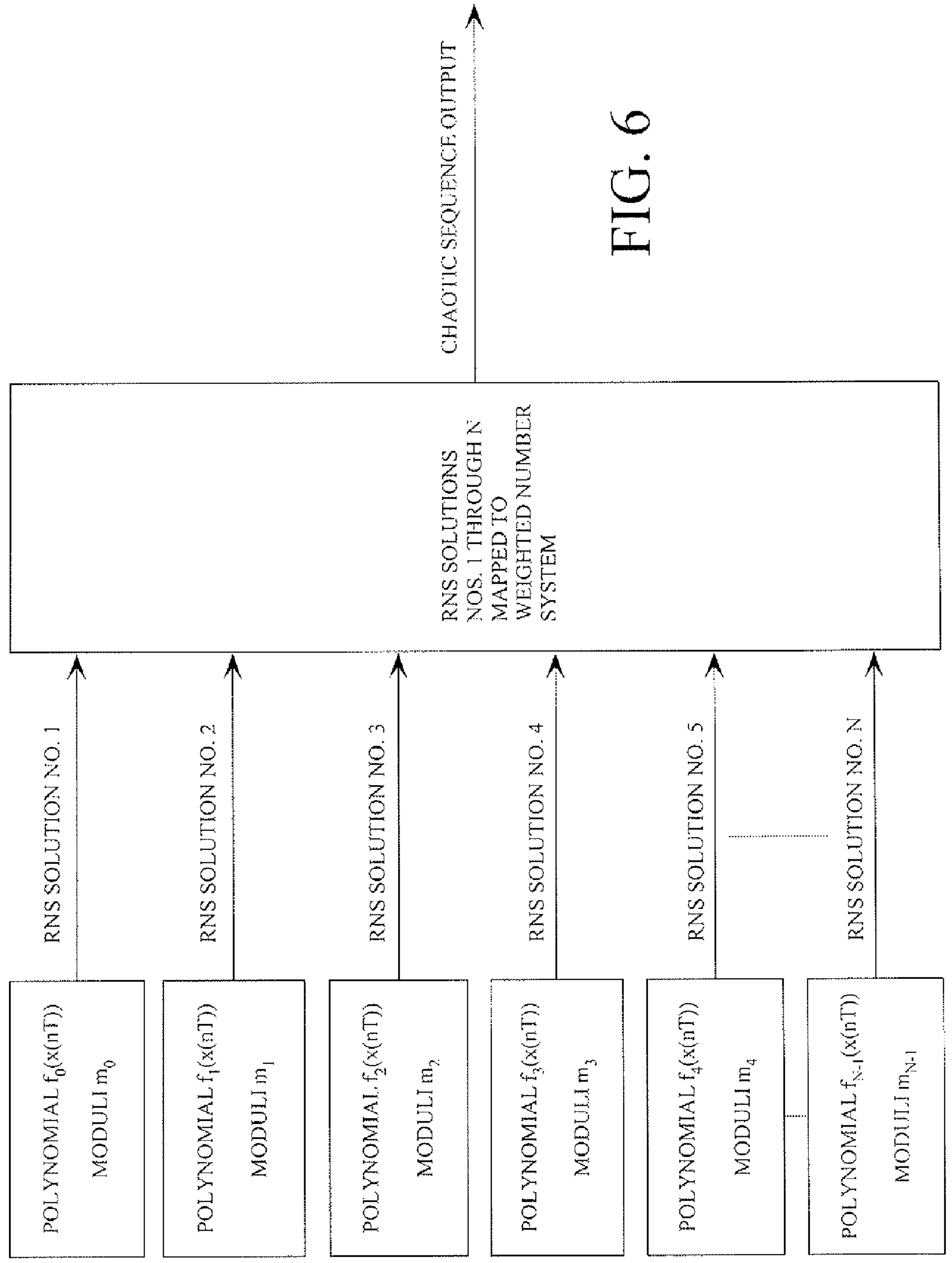
FIG. 6 is a conceptual diagram of the chaos generators of FIGS. 4 and 5B that is useful for understanding the present invention.

Referring now to FIG. 6, there is provided a conceptual diagram of a chaos generators $\mathbf{414}_1, \ldots, \mathbf{414}_S$, 434, 530, $\mathbf{540}_1, \ldots, \mathbf{540}_S$ (described above in relation to FIG. 4 and FIGS. 5A-5B). As shown in FIG. 6, generation of the chaotic sequence begins with N polynomial equations $f_0(x(nT)), \ldots, f_{N-1}(x(nT))$. The polynomial equations $f_0(x(nT)), \ldots, f_{N-1}(x(nT))$ can be selected as the same polynomial equation or as different polynomial equations. According to an aspect of the invention, the polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (f). For example, the polynomial equation f(x(nT)) is irreducible if there does not exist two (2) non-constant polynomial equations g(x(nT)) and h(x(nT)) in x(nT) with rational coefficients such that $f(x(nT))=g(x(nT))\cdot h(x(nT))$.

Each of the polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e., modulo operations. Modulo operations are well known to persons having ordinary skill in the art, and therefore will not be described herein. However, it should be appreciated that an RNS residue representation for some weighted value "a" can be defined by mathematical equation (3).

$$R=\{a \text{ modulo } m_0, a \text{ modulo } m_1, \ldots, a \text{ modulo } m_{N-1}\} \quad (3)$$

where R is an RNS residue N-tuple value representing a weighted value "a" and $m_0, m_1, \ldots, m_{N-1}$ respectively are the moduli for RNS arithmetic operations applicable to each polynomial equation $f_0(x(nT)), \ldots, f_{N-1}(x(nT))$. R(nT) can be a representation of the RNS solution of a polynomial equation f(x(nT)) defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers", as used herein, refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

The RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the polynomial equations $f_0(x(nT)), \ldots, f_{N-1}(x(nT))$ is selected as an irreducible cubic polynomial equation having chaotic properties in Galois field arithmetic. Each of the polynomial equations $f_0(x(nT)), \ldots, f_{N-1}(x(nT))$ can also be selected to be a constant or varying function of time. The irreducible cubic polynomial equation is defined by a mathematical equation (4).

$$f(x(nT))=Q(k)x^3(nT)+R(k)x^2(nT)+S(k)x(nT)+C(k,L) \quad (4)$$

where:

x is value for a variable defining a sequence location;

n is a sample time index value;

k is a polynomial time index value;

L is a constant component time index value;

T is a fixed constant having a value representing a time interval or increment;

Q, R, and S are coefficients that define the polynomial equation f(x(nT)); and

C is a coefficient of x(nT) raised to a zero power and is therefore a constant for each polynomial characteristic.

In a preferred embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the polynomial equations $f_0(x(nT)), \ldots, f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots, m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, embodiments of the present invention are not limited in this regard.

The number of discrete magnitude states (dynamic range) that can be generated with the system shown in FIG. 6 will depend on the quantity of polynomial equations N and the modulus values $m_0, m_1, \ldots, m_{N-1}$ values selected for the RNS number systems. In particular, this value can be calculated as the product $M=m_0 \cdot m_1, \cdot m_3 \cdot m_4 \cdot \ldots m_{N-1}$.

Referring again to FIG. 6, it should be appreciated that each of the RNS solutions No. 1, . . . , No. N is expressed in a binary number system representation. As such, each of the RNS solutions No. 1, . . . , No. N is a binary sequence of bits. Each bit of the sequence has a zero (0) value or a one (1) value. Each binary sequence has a bit length selected in accordance with particular moduli.

According to an embodiment of the invention, each binary sequence representing a residue value has a bit length (BL) defined by a mathematical equation (5).

$$BL=\text{Ceiling}[\text{Log } 2(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number pi associated with a second modulus ml is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5$=503·491·479·467·257·251=3,563,762,191,059,523. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Still, the invention is not limited in this regard.

Referring again to FIG. 6, the RNS solutions No. 1, . . . , No. N are mapped to a weighted number system representation thereby forming a chaotic sequence output. The phrase "weighted number system", as used herein, refers to a number system other than a residue number system. Such weighted number systems include, but are not limited to, an integer number system, a binary number system, an octal number system, and a hexadecimal number system.

According to an aspect of the invention, the RNS solutions No. 1, . . . , No. N are mapped to a weighted number system representation by determining a series of digits in the weighted number system based on the RNS solutions No. 1, . . . , No. N. The term "digit", as used herein, refers to a symbol of a combination of symbols to represent a number. For example, a digit can be a particular bit of a binary sequence. According to another aspect of the invention, the RNS solutions No. 1, . . . , No. N are mapped to a weighted number system representation by identifying a number in the weighted number system that is defined by the RNS solutions No. 1, . . . , No. N. According to yet another aspect of the invention, the RNS solutions No. 1, . . . , No. N are mapped to a weighted number system representation by identifying a truncated portion of a number in the weighted number system that is defined by the RNS solutions No. 1, . . . , No. N. The truncated portion can include any serially arranged set of digits of the number in the weighted number system. The truncated portion can also be exclusive of a most significant digit of the number in the weighted number system. The truncated portion can be a chaotic sequence with one or more digits removed from its beginning and/or ending. The truncated portion can also be a segment including a defined number of digits extracted from a chaotic sequence. The truncated portion can further be a result of a partial mapping of the RNS solutions No. 1, . . . , No. N to a weighted number system representation.

According to an embodiment of the invention, a mixed-radix conversion method is used for mapping RNS solutions No. 1, . . . , No. N to a weighted number system representation. "The mixed-radix conversion procedure to be described here can be implemented in" [modulo moduli only and not modulo the product of moduli.] *See Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \le a_i \le R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See } \textit{Id}.$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[x = a_N \prod_{i=1}^{N-1} m_i + \ldots + a_3 m_1 m_2 + a_2 m_1 + a_1\right]$$

shows then that x is $a_2$. In this way, by successive subtracting and dividing in residue notation, all of the mixed-radix digits may be obtained." See Id.

"It is interesting to note that $$a_1 = \langle x \rangle_{m_1},\ a_2 = \left\langle \left\lfloor \frac{x}{m_1} \right\rfloor \right\rangle_{m_2},\ a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions No. 1, . . . , No. N to a weighted number system representation. The CRT arithmetic operation can be defined by a mathematical equation (6) [returning to zero (0) based indexing].

where Y is the result of the CRT arithmetic operation;

n is a sample time index value;

T is a fixed constant having a value representing a time interval or increment;

$x_0, \ldots, x_{N-1}$ are RNS solutions No. 1, . . . , No. N;

$p_0, p_1, \ldots, p_{N-1}$ are prime numbers;

M is a fixed constant defined by a product of the relatively prime numbers $p_0, p_1, \ldots, p_{N-1}$; and $b_0, b_1, \ldots, b_{N-1}$ are fixed constants that are chosen as the multiplicative inverses of the product of all other primes modulo $p_0, p_1, \ldots, p_{N-1}$, respectively.

Equivalently, $$b_j = \left(\frac{M}{p_j}\right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, all $b_j$'s can be set equal to one or more non-zero values without loss of the chaotic properties. The invention is not limited in this regard.

Referring again to FIG. 6, the chaotic sequence output can be expressed in a binary number system representation. As such, the chaotic sequence output can be represented as a binary sequence. Each bit of the binary sequence has a zero (0) value or a one (1) value. The chaotic sequence output can have a maximum bit length (MBL) defined by a mathematical equation (7).

$$MBL = \text{Ceiling}[\text{Log } 2(M)] \tag{7}$$

where M is the product of the relatively prime numbers $p_0, p_1, \ldots, p_{N-1}$ selected as moduli $m_0, m_1, \ldots, m_{N-1}$. In this regard, it should be appreciated that M represents a dynamic range of a CRT arithmetic operation. The phrase "dynamic range", as used herein, refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059,523). By substituting the value of M into mathematical equation (7), the bit length (BL) for a chaotic sequence output Y expressed in a binary system representation can be calculated as follows: BL=Ceiling[Log 2(3,563,762,191,059,523)]=52 bits. As such, the chaotic sequence output is a fifty-two (52) bit binary sequence having an integer value between zero (0) and three quadrillion five hundred sixty- $$Y = \left\langle \begin{array}{l} \left\langle \langle [3x_0^3((n-1)T) + 3x_0^2((n-1)T) + x_0((n-1)T) + C_0(nT)]b_0 \rangle_{p_0} \dfrac{M}{p_0} \right\rangle_M + \ldots + \\ \left\langle \langle [3x_{N-1}^3((n-1)T) + 3x_{N-1}^2((n-1)T) + x_{N-1}((n-1)T) + C_{N-1}(nT)]b_{N-1} \rangle_{p_{N-1}} \dfrac{M}{p_{N-1}} \right\rangle_M \end{array} \right\rangle_M \tag{6}$$

three trillion seven hundred sixty-two billion one hundred ninety-one million fifty-nine thousand five hundred twenty-two (3,563,762,191,059,522), inclusive. Still, the invention is not limited in this regard. For example, the chaotic sequence output can be a binary sequence representing a truncated portion of a value between zero (0) and M−1. In such a scenario, the chaotic sequence output can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (32) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1ms))=3x^3((n-1)\cdot 1ms)+3x^2((n-1)\cdot 1ms)+x((n-1)\cdot 1ms)+8$ modulo 503. n is a variable having a value defined by an iteration being performed. x has a value allowable in a residue ring. In a first iteration, n equals one (1) and x is selected as two (2) which is allowable in a residue ring. By substituting the value of n and x into the stated polynomial equation f(x(nT)), a first solution having a value forty-six (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 7:
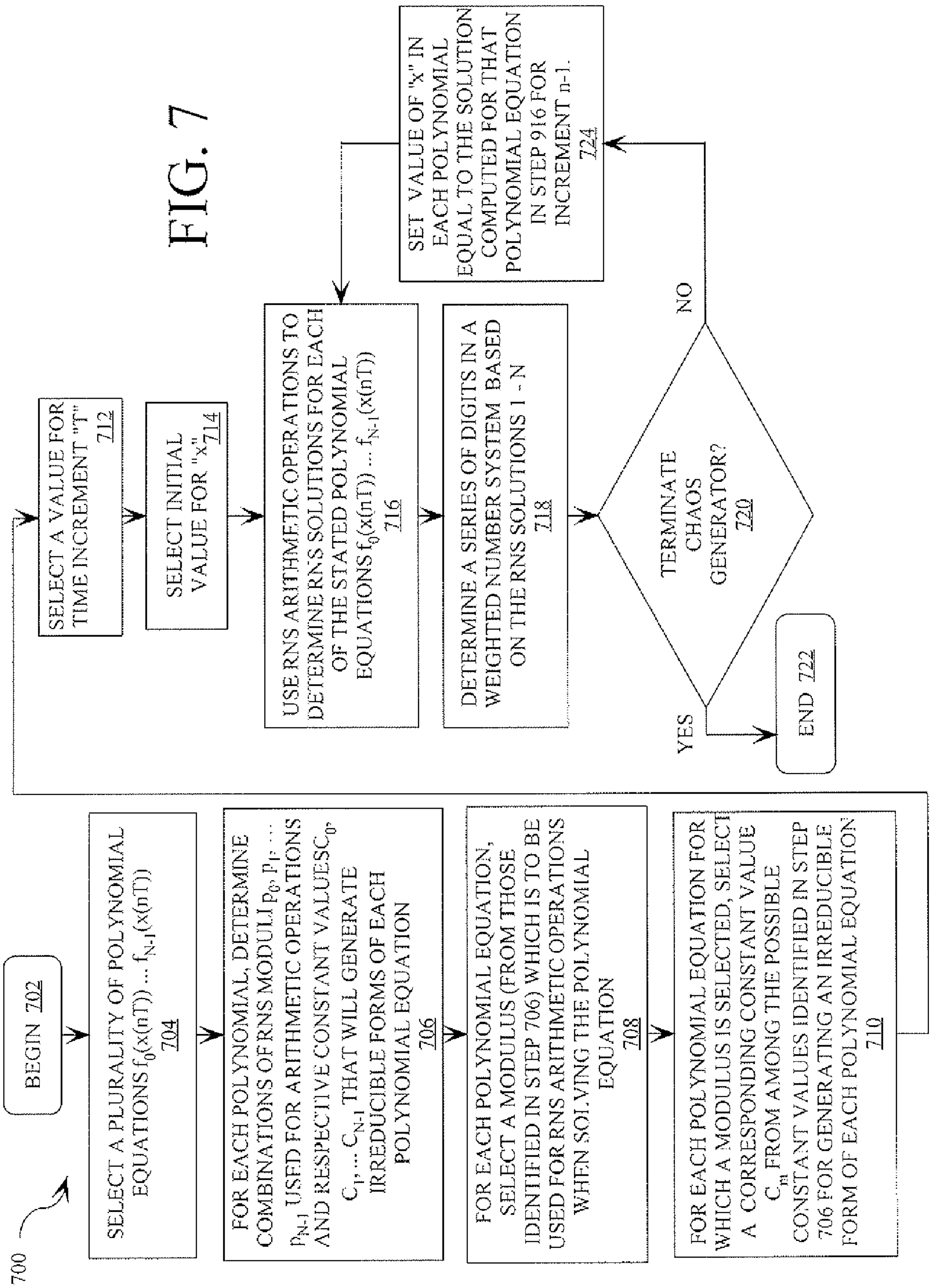
FIG. 7 is a flow diagram of a method for generating a chaotic spreading code (or chaotic sequence) that is useful for understanding the present invention.

Referring now to FIG. 7, there is provided a flow diagram of a method 700 for generating a chaotic sequence according to an embodiment of the invention. As shown in FIG. 7, method 700 begins with step 702 and continues with step 704. In step 704, a plurality of polynomial equations $f_0(x(nT)), \ldots, f_{N-1}(x(nT))$ are selected. The polynomial equations $f_0(x(nT)), \ldots, f_{N-1}(x(nT))$ can be selected as the same polynomial equation except for a different constant term or different polynomial equations. After step 704, step 706 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 708, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. The modulus is selected from the moduli identified in step 706. It should also be appreciated that a different modulus must be selected for each polynomial equation $f_0(x(nT)), \ldots, f_{N-1}(x(nT))$.

As shown in FIG. 7, method 700 continues with a step 710. In step 710, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant Cm is selected from among the possible constant values identified in step 706 for generating an irreducible form of the respective polynomial equation $f_0(x(nT)), \ldots, f_{N-1}(x(nT))$.

After step 710, method 700 continues with step 712. In step 712, a value for time increment T is selected. Thereafter, an initial value for the variable x of the polynomial equations is selected. The initial value for the variable x can be any value allowable in a residue ring. Notably, the initial value of the variable x defines a sequence starting location. As such, the initial value of the variable x can define a static offset of a chaotic sequence.

Referring again to FIG. 7, method 700 continues with step 716. In step 716, RNS arithmetic operations are used to iteratively determine RNS solutions for each of the stated polynomial equations $f_0(x(nT)), \ldots, f_{N-1}(x(nT))$. In step 718, a series of digits in a weighted number system are determined based in the RNS solutions. Step 718 can involve performing a mixed radix arithmetic operation or a CRT arithmetic operation using the RNS solutions to obtain a chaotic sequence output.

After completing step 718, method 700 continues with a decision step 720. If a chaos generator is not terminated (720:NO), then step 724 is performed where a value of the variable "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 716. Subsequently, method 700 returns to step 716. If the chaos generator is terminated (720:YES), then step 722 is performed where method 700 ends.

Figure 8:
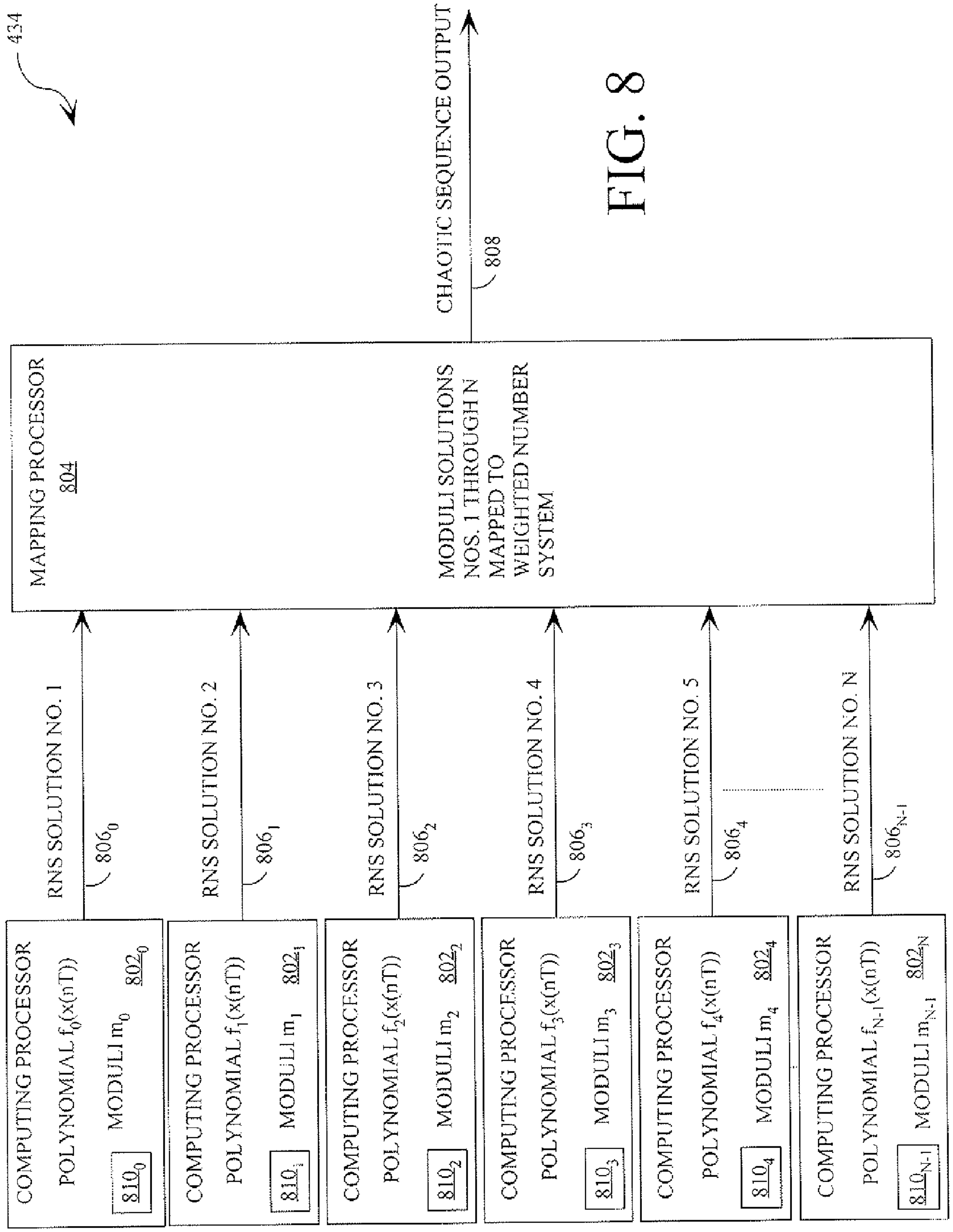
FIG. 8 is a block diagram of the chaos generator shown in FIGS. 4 and 5B that is useful for understanding the present invention.

Referring now to FIG. 8, there is illustrated one embodiment of the chaos generator 434 shown in FIG. 4. Chaos generators $\mathbf{414}_1, \ldots, \mathbf{414}_S$, 530, $\mathbf{540}_1, \ldots, \mathbf{540}_S$ are the same as or substantially similar to chaos generator 434. As such, the following discussion of chaos generator 434 is sufficient for understanding chaos generators $\mathbf{414}_1, \ldots, \mathbf{414}_S$, 530, $\mathbf{540}_1, \ldots, \mathbf{540}_S$ of FIG. 4 and FIG. 5B.

As shown in FIG. 8, chaos generator 434 is generally comprised of hardware and/or software configured to generate a digital chaotic sequence. Accordingly, chaos generator 434 is comprised of computing processors $\mathbf{802}_0, \ldots, \mathbf{802}_{N-1}$ and a mapping processor 804. Each computing processor $\mathbf{802}_0, \ldots, \mathbf{802}_{N-1}$ is coupled to the mapping processor 804 by a respective data bus $\mathbf{806}_0, \ldots, \mathbf{806}_{N-1}$. As such, each computing processor $\mathbf{802}_0, \ldots, \mathbf{802}_{N-1}$ is configured to communicate data to the mapping processor 804 via a respective data bus $\mathbf{806}_0, \ldots, \mathbf{806}_{N-1}$. Mapping processor 804 can be coupled to an external device (not shown) via a data bus 808. The external device (not shown) includes, but is not limited to, a communications device configured to combine or modify a signal in accordance with a chaotic sequence output.

Referring again to FIG. 8, computing processors $\mathbf{802}_0, \ldots, \mathbf{802}_{N-1}$ are comprised of hardware and/or software configured to solve the polynomial equations $f_0(x(nT)), \ldots, f_{N-1}(x(nT))$ to obtain a plurality of solutions. The polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT)), \ldots, f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $\mathbf{802}_0, \ldots, \mathbf{802}_{N-1}$ employ modulo operations to calculate a respective solution for each polynomial equation $f_0(x(nT)), \ldots, f_{N-1}(x(nT))$ using modulo based arithmetic operations. Each of the computing processors $\mathbf{802}_0, \ldots, \mathbf{802}_{N-1}$ is comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $\mathbf{802}_0, \ldots, \mathbf{802}_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $\mathbf{802}_0, \ldots, \mathbf{802}_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $\mathbf{810}_0, \ldots, \mathbf{810}_{N-1}$ are chaotic. In this regard, it should be appreciated that the feedback mechanisms $\mathbf{810}_0, \ldots, \mathbf{810}_{N-1}$ are provided so that the solutions for each polynomial equation $f_0(x(nT)), \ldots, f_{N-1}(x(nT))$ can be iteratively computed. Accordingly, the feedback mechanisms $\mathbf{810}_0, \ldots, \mathbf{810}_{N-1}$ are comprised of hardware and/or software configured to selectively define variables "x" of a polynomial equation as a solution computed in a previous iteration.

Referring again to FIG. 8, computing processor $\mathbf{802}_0, \ldots, \mathbf{802}_{N-1}$ are further comprised of hardware and/or software configured to express each of the RNS residue values in a binary number system representation. In this regard, the computing processors $\mathbf{802}_0, \ldots, \mathbf{802}_{N-1}$ can employ an RNS-to-binary conversion method. Such RNS-to-binary conversion methods are generally known to persons having ordinary skill in the art, and therefore will not be described herein. However, it should be appreciated that any such RNS-to-binary conversion method can be used without limitation. It should also be appreciated that the residue values expressed in binary number system representations are hereinafter referred to as moduli solutions No. 1, . . . , No. N comprising the elements of an RNS N-tuple.

According to an embodiment of the invention, computing processors $\mathbf{802}_0, \ldots, \mathbf{802}_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. The table address is used to initiate the chaotic sequence at the start of an iteration. The invention is not limited in this regard.

Referring again to FIG. 8, mapping processor 804 is comprised of hardware and/or software configured to map the moduli (RNS N-tuple) solutions No. 1, . . . , No. N to a weighted number system representation. The result is a series of digits in the weighted number system based on the moduli solutions No. 1, . . . , No. N. For example, mapping processor 804 can be comprised of hardware and/or software configured to determine the series of digits in the weighted number system based on the RNS residue values using a Chinese Remainder Theorem process. In this regard, it will be appreciated by those having ordinary skill in the art that mapping processor 804 is comprised of hardware and/or software configured to identify a number in the weighted number system that is defined by the moduli solutions No. 1, . . . , No. N.

According to an aspect of the invention, mapping processor 804 can be comprised of hardware and/or software configured to identify a truncated portion of a number in the weighted number system that is defined by the moduli solutions No. 1, . . . , No. N. For example, mapping processor 804 can be comprised of hardware and/or software configured to select the truncated portion to include any serially arranged set of digits of the number in the weighted number system. Mapping processor 804 can also include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. The invention is not limited in this regard.

Referring again to FIG. 8, mapping processor 804 is comprised of hardware and/or software configured to express a chaotic sequence in a binary number system representation. In this regard, it should be appreciated that mapping processor 804 can employ a weighted-to-binary conversion method. Weighted-to-binary conversion methods are generally known to persons having ordinary skill in the art, and therefore will not be described herein. However, it should be appreciated that any such weighted-to-binary conversion method can be used without limitation.

In view of the forgoing, the parameters used to generate the chaotic spreading codes include a sequence location parameter defined by variable "x" of a polynomial equation, a polynomial equation parameter defined by the constant C, and a moduli parameter defined by modulus $m_0, \ldots, m_{N-1}$. The value for a variable "x" defines a sequence location, i.e., the number of places (e.g., zero, one, two, Etc.) that a chaotic sequence is to be cyclically shifted. The value for the variable "x" can be determined using a random number of a random number sequence (RNS). RNSs are well known to those having ordinary skill in the art, and therefore will not be described herein. However, it should be understood the RNS can be generated by an RNS generator (not shown). A different value for at least one of the listed parameters can be changed during each of two or more timeslots of a TDM frame. The different value causes causing a cyclic shift in a spreading sequence or a change from a first spreading code to a second spreading code.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A method for selectively controlling access to multiple data streams which are communicated from a first communication device using a timeslotted shared frequency spectrum and shared spreading codes, comprising the steps of:

performing discrete-time modulation processes using at least two protected data signals including protected data to form at least two first modulated signals;

performing a numerical sequence generation process to generate first chaotic spreading codes;

combining the first modulated signals with respective ones of said first chaotic spreading codes to form digital chaotic signals having spread spectrum formats;

additively combining the digital chaotic signals to form a composite protected data communication signal;

time division multiplexing the composite protected data communication signal with a global data communication signal including global data to form an output communication signal; and transmitting said output communication signal from the first communication device over a communications channel;

wherein different values for a polynomial equation parameter for said numerical sequence generation process are used during a first pre-defined duration and a second pre-defined duration to generate at least one of said first chaotic spreading codes, said first and second pre-defined durations equal to a duration of a TDM frame or a timeslot; and wherein different parameters for at least one of said discrete-time modulation processes are used during said first-defined duration and said second pre-defined duration to generate at least one of said first modulated signals.

2. The method according to claim 1, further comprising selecting each of said first chaotic spreading codes to be a chaotic spreading sequence generated using a plurality of polynomial equations and modulo operations.

3. The method according to claim 1, wherein each of the discrete-time modulation processes is selected from the group comprising an M-ary phase shift keying modulation process, a quadrature amplitude modulation process and an amplitude shift keying modulation process.

4. The method according to claim 3, wherein the second modulated signal is formed using an amplitude-and-time-discrete modulation process.

5. The method according to claim 1, further comprising the steps of:

modulating a global data signal to form a second modulated signal; and combining the second modulated signal with a second chaotic spreading code to form the global data communication signal having a spread spectrum format.

6. The method according to claim 1, wherein the output communication signal is transmitted from the first communication device to a second communication device having at least one key to recover all of the protected data and the global data transmitted during two or more timeslots of said TDM frame.

7. The method according to claim 1, wherein the output communication signal is transmitted from the first communication device to a second communication device having at least one key to recover the global data and a portion of the protected data transmitted during two or more timeslots of said TDM frame.

8. The method according to claim 1, wherein the output communication signal is transmitted from the first communication device to a second communication device having at least one key to recover only the global data transmitted during two or more timeslots of said TDM frame.

9. The method according to claim 1, wherein at least a portion of the composite protected data communication signal is transmitted in a first timeslot of said TDM frame and at least a portion of the global data communication signal is transmitted in a second timeslot different from the first timeslot of the TDM frame.

10. The method according to claim 1, wherein at least a portion of the composite protected data communication signal and at least a portion of the global data communication signal are transmitted in the same timeslot of said TDM frame.

11. A method for selectively controlling access to multiple data streams which are communicated from a first communication device using a timeslotted shared frequency spectrum and shared spreading codes, comprising the steps of:

performing discrete-time modulation processes using at least two protected data signals including protected data to form at least two first modulated signals;

performing a numerical sequence generation process to generate first chaotic spreading codes;

combining the first modulated signals with respective ones of said first chaotic spreading codes to form digital chaotic signals having spread spectrum formats;

additively combining the digital chaotic signals to form a composite protected data communication signal;

time division multiplexing the composite protected data communication signal with a global data communication signal including global data to form an output communication signal; and transmitting said output communication signal from the first communication device over a communications channel;

wherein different values for a sequence location parameter for said numerical sequence generation process are used during a first pre-defined duration and a second pre-defined duration to generate at least one of said first chaotic spreading codes, said first and second pre-defined durations equal to a duration of a TDM frame or a timeslot;

wherein different parameters for at least one of said discrete-time modulation processes are used during said first-defined duration and said second pre-defined duration to generate at least one of said first modulated signals; and wherein different values for at least one of a polynomial equation parameter and an N-tuple of moduli parameter are used for said numerical sequence generation process during said first pre-defined duration and said second pre-defined duration to generate at least one of said first chaotic spreading codes.

12. A method for selectively controlling access to multiple data streams which are communicated from a first communication device using a timeslotted shared frequency spectrum and shared spreading codes, comprising the steps of:

performing discrete-time modulation processes using at least two protected data signals including protected data to form at least two first modulated signals;

performing a numerical sequence generation process to generate first chaotic spreading codes:

combining the first modulated signals with respective ones of said first chaotic spreading codes to form digital chaotic signals having spread spectrum formats;

additively combining the digital chaotic signals to form a composite protected data communication signal;

modulating a global data signal to form a second modulated signal;

combining the second modulated signal with a second chaotic spreading code to form the global data communication signal having a spread spectrum format;

time division multiplexing the composite protected data communication signal with said global data communication signal including global data to form an output communication signal; and transmitting said output communication signal from the first communication device over a communications channel;

wherein different values for a sequence location parameter for said numerical sequence generation process are used during a first pre-defined duration and a second pre-defined duration to generate at least one of said first chaotic spreading codes, said first and second pre-defined durations equal to a duration of a TDM frame or a timeslot;

wherein different parameters for at least one of said discrete-time modulation processes are used during said first-defined duration and said second pre-defined duration to generate at least one of said first modulated signals; and wherein an amplitude-and-time-discrete modulation process is selected from the group comprising an M-ary phase shift keying modulation process, a quadrature amplitude modulation process and an amplitude shift keying modulation process.

13. A communication system configured for selectively controlling access to multiple data streams which are communicated using a timeslotted shared frequency spectrum and shared spreading codes, comprising:

a first modulator configured to perform discrete-time modulation processes using at least two protected data signals including protected data to form at least two first modulated signals;

a first sequence generator configured to perform a numerical sequence generation process to generate first chaotic spreading codes;

a first combiner configured to combine the first modulated signals with respective ones of said first chaotic spreading codes to form digital chaotic signals having spread spectrum formats;

a second combiner configured to additively combine the digital chaotic signals to form a composite protected data communication signal;

a multiplexer configured to time division multiplex the composite protected data communication signal with a global data communication signal including global data to form an output communication signal; and a transceiver configured to transmit said output communication signal from a first communication device to a second communication device over a communications channel;

wherein different values for a polynomial equation parameter for said numerical sequence generation process are used by said first generator during a first pre-defined duration and a second pre-defined duration to generate at least one of said first chaotic spreading codes, said first and second pre-defined duration equal to a duration of a TDM frame or a timeslot; and wherein different parameters for at least one of said discrete-time modulation processes are used during said first-defined duration and said second pre-defined duration to generate at least one of said first modulated signals.

14. The communication system according to claim 13, further comprising at least one generator configured to generate each of said first chaotic spreading codes using a plurality of polynomial equations and modulo operations.

15. The communication system according to claim 13, further comprising:

a second modulator configured to modulate a global data signal to form a second modulated signal; and a third combiner configured to combine the second modulated signal with a second chaotic spreading code to form the global data communication signal having a spread spectrum format.

16. The communication system according to claim 15, wherein the second modulated signal is formed using an amplitude-and-time-discrete modulation process.

17. The communication system according to claim 13, wherein the second communication device has at least one key to recover all of the protected data and the global data transmitted during two or more timeslots of said TDM frame.

18. The communication system according to claim 13, wherein the second communication device has at least one key to recover the global data and a portion of the protected data transmitted during two or more timeslots of said TDM frame.

19. The communication system according to claim 13, wherein the second communication device having at least one key to recover only the global data transmitted during two or more timeslots of said TDM frame.

20. The communication system according to claim 13, wherein at least a portion of the composite protected data communication signal is transmitted in a first timeslot of said TDM frame and at least a portion of the global data communication signal is transmitted in a second timeslot different from the first timeslot of the TDM frame.

21. The communication system according to claim 13, wherein at least a portion of the composite protected data communication signal and at least a portion of the global data communication signal are transmitted in the same timeslot of said TDM frame.

22. A communication system configured for selectively controlling access to multiple data streams which are communicated using a timeslotted shared frequency spectrum and shared spreading codes, comprising:

a first modulator configured to perform discrete-time modulation processes using at least two protected data signals including protected data to form at least two first modulated signals;

a first sequence generator configured to perform a numerical sequence generation process to generate first chaotic spreading codes;

a first combiner configured to combine the first modulated signals with respective ones of said first chaotic spreading codes to form digital chaotic signals having spread spectrum formats;

a second combiner configured to additively combine the digital chaotic signals to form a composite protected data communication signal;

a multiplexer configured to time division multiplex the composite protected data communication signal with a global data communication signal including global data to form an output communication signal; and a transceiver configured to transmit said output communication signal from a first communication device to a second communication device over a communications channel;

wherein different values for a sequence location parameter for said numerical sequence generation process are used by said first generator during a first pre-defined duration and a second pre-defined duration to generate at least one of said first chaotic spreading codes, said first and second pre-defined duration equal to a duration of a TDM frame or a timeslot;

wherein different parameters for at least one of said discrete-time modulation processes are used during said first-defined duration and said second pre-defined duration to generate at least one of said first modulated signals; and wherein different values for at least one of a polynomial equation parameter and an N-tuple of moduli parameter are used for said numerical sequence generation process during said first pre-defined duration and said second pre-defined duration to generate at least one of said first chaotic spreading codes.

* * * * *